(12) United States Patent
Eisen

(10) Patent No.: US 7,853,533 B2
(45) Date of Patent: Dec. 14, 2010

(54) METHOD AND SYSTEM FOR IDENTIFYING USERS AND DETECTING FRAUD BY USE OF THE INTERNET

(75) Inventor: Ori Eisen, Scottsdale, AZ (US)

(73) Assignee: The 41st Parameter, Inc., Scottsdale, AZ (US)

( * ) Notice: Subject to any disclaimer, the term of this patent is extended or adjusted under 35 U.S.C. 154(b) by 289 days.

(21) Appl. No.: 11/241,739

(22) Filed: Sep. 29, 2005

(65) Prior Publication Data
US 2007/0239606 A1    Oct. 11, 2007

Related U.S. Application Data

(63) Continuation-in-part of application No. 10/791,439, filed on Mar. 2, 2004, now abandoned.

(60) Provisional application No. 60/694,768, filed on Jun. 27, 2005.

(51) Int. Cl.
*G06Q 20/00* (2006.01)
(52) U.S. Cl. .............................. 705/64; 705/67; 705/76; 368/89; 702/1; 700/110; 377/20; 377/16
(58) Field of Classification Search .................... 705/64
See application file for complete search history.

(56) References Cited

U.S. PATENT DOCUMENTS

| | | | | |
|---|---|---|---|---|
| 5,892,900 | A * | 4/1999 | Ginter et al. | .................. 726/26 |
| 6,092,053 | A | 7/2000 | Boesch et al. | |
| 6,105,012 | A | 8/2000 | Chang et al. | |
| 6,112,240 | A | 8/2000 | Pogue et al. | |
| 6,148,407 | A | 11/2000 | Aucsmith | |
| 6,205,436 | B1 * | 3/2001 | Rosen | ......................... 705/65 |
| 6,718,363 | B1 | 4/2004 | Ponte | |
| 6,895,507 | B1 * | 5/2005 | Teppler | ....................... 726/19 |
| 6,898,709 | B1 | 5/2005 | Teppler | |
| 6,908,030 | B2 | 6/2005 | Rajasekaran et al. | |
| 6,957,339 | B2 * | 10/2005 | Shinzaki | ..................... 713/186 |

(Continued)

FOREIGN PATENT DOCUMENTS

WO    WO 01/11450 A1    2/2001

(Continued)

OTHER PUBLICATIONS

White, Ron, "How Computers Work", Millennium Ed., Que Corporation, Indianapolis, IN, 1999.*

(Continued)

*Primary Examiner*—Andrew J. Fischer
*Assistant Examiner*—Chrystina Zelaskiewicz
(74) *Attorney, Agent, or Firm*—Wilson Sonsini Goodrich & Rosati

(57) ABSTRACT

A method and system for detecting and preventing Internet fraud in online transactions by utilizing and analyzing a number of parameters to uniquely identify a computer user and potential fraudulent transaction through predictive modeling. The method and system uses a delta of time between the clock of the computer used by the actual fraudulent use and the potentially fraudulent user and the clock of the server computer in conjunction with personal information and/or non-personal information, preferably the Browser ID.

14 Claims, 21 Drawing Sheets

U.S. PATENT DOCUMENTS

| | | | |
|---|---|---|---|
| 7,089,585 B1* | 8/2006 | Dharmarajan | 726/8 |
| 7,100,049 B2 | 8/2006 | Gasparini et al. | |
| 7,165,051 B2* | 1/2007 | Ronning et al. | 705/64 |
| 7,191,467 B1 | 3/2007 | Dujari et al. | |
| 7,260,837 B2 | 8/2007 | Abraham et al. | |
| 7,272,728 B2 | 9/2007 | Pierson et al. | |
| 7,330,871 B2 | 2/2008 | Barber | |
| 7,349,955 B1 | 3/2008 | Korb et al. | |
| 7,438,226 B2 | 10/2008 | Helsper et al. | |
| 7,577,620 B1 | 8/2009 | Donner | |
| 2001/0016876 A1* | 8/2001 | Kurth et al. | 709/223 |
| 2002/0035622 A1* | 3/2002 | Barber | 709/220 |
| 2002/0073046 A1 | 6/2002 | David | |
| 2002/0112171 A1 | 8/2002 | Ginter et al. | |
| 2002/0156836 A1 | 10/2002 | Janosik et al. | |
| 2003/0033356 A1 | 2/2003 | Tran et al. | |
| 2003/0076242 A1 | 4/2003 | Burns et al. | |
| 2003/0105854 A1 | 6/2003 | Thorsteinsson et al. | |
| 2003/0182551 A1 | 9/2003 | Frantz et al. | |
| 2003/0208684 A1 | 11/2003 | Camacho et al. | |
| 2004/0034794 A1 | 2/2004 | Mayer et al. | |
| 2004/0117321 A1 | 6/2004 | Sancho | |
| 2004/0181598 A1 | 9/2004 | Paya et al. | |
| 2004/0203750 A1 | 10/2004 | Cowdrey et al. | |
| 2004/0254890 A1 | 12/2004 | Sancho et al. | |
| 2005/0076230 A1 | 4/2005 | Redenbaugh et al. | |
| 2005/0108177 A1 | 5/2005 | Sancho | |
| 2005/0113092 A1 | 5/2005 | Coppinger et al. | |
| 2005/0131826 A1 | 6/2005 | Cook | |
| 2005/0188423 A1 | 8/2005 | Motsinger et al. | |
| 2005/0278542 A1 | 12/2005 | Pierson et al. | |
| 2006/0010072 A1 | 1/2006 | Eisen | |
| 2006/0048211 A1 | 3/2006 | Pierson et al. | |
| 2006/0130132 A1 | 6/2006 | Dharmarajan | |
| 2006/0200856 A1 | 9/2006 | Salowey et al. | |
| 2006/0264202 A1 | 11/2006 | Hagmeier et al. | |
| 2006/0282660 A1 | 12/2006 | Varghese et al. | |
| 2007/0043837 A1 | 2/2007 | Kruse et al. | |
| 2007/0073630 A1 | 3/2007 | Greene et al. | |
| 2007/0234409 A1 | 10/2007 | Eisen | |
| 2008/0010678 A1 | 1/2008 | Burdette et al. | |
| 2008/0104672 A1 | 5/2008 | Lunde et al. | |
| 2008/0104684 A1 | 5/2008 | Lunde et al. | |
| 2008/0133420 A1 | 6/2008 | Barber | |
| 2009/0037213 A1 | 2/2009 | Eisen | |
| 2009/0083184 A1 | 3/2009 | Eisen | |
| 2010/0004965 A1 | 1/2010 | Eisen | |

FOREIGN PATENT DOCUMENTS

| | | | |
|---|---|---|---|
| WO | WO 2004/038997 A1 | 5/2004 | |

OTHER PUBLICATIONS

Derfler et al., "How Networks Work", Millennium Ed., Que Corporation, Indianapolis, IN, 2000.*

Gralla, Preston, "How the Internet Works", Millennium Ed., Que Corporation, Indianapolis, IN, 1999.*

Kohno, Tadayoshi, Broido, Andre and Claffy, K.C.; Remote Physical Device Fingerprinting; 2005 IEEE Syposium on Security and Privacy (IEEE S&P 2005); May 8-11, 2005; Oakland, California, U.S.A.; 16 pages.

Manavoglu, et al. Probabilistic user behavior models. Data Mining. 2003; 203-210.

Eisen, O., U.S. Appl. No. 11/862,165, entitled "Methods and Apparatus for Detecting Fraud with Time Based Computer Tags" filed Sep. 26, 2007.

International search report dated Oct. 29, 2007 for PCT Application No. US2005/35532.

International search report dated Jul. 3, 2008 for PCT Application No. US2007/65776.

* cited by examiner

| TimeDiff | ORDERTIME | CUSTLOCAL TIME | EMAIL | BROWSERID | CARD HOLDER | CARD NUMBER |
|---|---|---|---|---|---|---|
| 605 | 09-Feb-02 | 09-Feb-02 | | MOZILLA/4.0 (COMPATIBLE; MSIE 5.0; WINDOWS 98; DIGEXT) | ADRIAN | XXXXXXXXXXXXXXXX |
| 605 | 09-Feb-02 | 09-Feb-02 | | MOZILLA/4.0 (COMPATIBLE; MSIE 5.0; WINDOWS 98; DIGEXT) | ADRIAN | XXXXXXXXXXXXXXXX |
| 605 | 09-Feb-02 | 09-Feb-02 | | MOZILLA/4.0 (COMPATIBLE; MSIE 5.0; WINDOWS 98; DIGEXT) | ADRIAN | XXXXXXXXXXXXXXXX |
| 605 | 09-Feb-02 | 09-Feb-02 | M | MOZILLA/4.0 (COMPATIBLE; MSIE 5.0; WINDOWS 98; DIGEXT) | ADRIAN | XXXXXXXXXXXXXXXX |
| 605 | 09-Feb-02 | 09-Feb-02 | M | MOZILLA/4.0 (COMPATIBLE; MSIE 5.0; WINDOWS 98; DIGEXT) | ADRIAN | XXXXXXXXXXXXXXXX |
| 605 | 09-Feb-02 | 09-Feb-02 | M | MOZILLA/4.0 (COMPATIBLE; MSIE 5.0; WINDOWS 98; DIGEXT) | ADRIAN | XXXXXXXXXXXXXXXX |
| 605 | 09-Feb-02 | 09-Feb-02 | M | MOZILLA/4.0 (COMPATIBLE; MSIE 5.0; WINDOWS 98; DIGEXT) | ADRIAN | XXXXXXXXXXXXXXXX |
| 605 | 09-Feb-02 | 09-Feb-02 | M | MOZILLA/4.0 (COMPATIBLE; MSIE 5.0; WINDOWS 98; DIGEXT) | ADRIAN | XXXXXXXXXXXXXXXX |
| 605 | 09-Feb-02 | 09-Feb-02 | M | MOZILLA/4.0 (COMPATIBLE; MSIE 5.0; WINDOWS 98; DIGEXT) | ADRIAN | XXXXXXXXXXXXXXXX |
| 605 | 09-Feb-02 | 09-Feb-02 | M | MOZILLA/4.0 (COMPATIBLE; MSIE 5.0; WINDOWS 98; DIGEXT) | ADRIAN | XXXXXXXXXXXXXXXX |
| 605 | 09-Feb-02 | 09-Feb-02 | M | MOZILLA/4.0 (COMPATIBLE; MSIE 5.0; WINDOWS 98; DIGEXT) | ADRIAN | XXXXXXXXXXXXXXXX |
| 605 | 09-Feb-02 | 09-Feb-02 | M | MOZILLA/4.0 (COMPATIBLE; MSIE 5.0; WINDOWS 98; DIGEXT) | ADRIAN | XXXXXXXXXXXXXXXX |
| 604 | 09-Feb-02 | 09-Feb-02 | M | MOZILLA/4.0 (COMPATIBLE; MSIE 5.0; WINDOWS 98; DIGEXT) | ADRIAN | XXXXXXXXXXXXXXXX |
| 604 | 09-Feb-02 | 09-Feb-02 | M | MOZILLA/4.0 (COMPATIBLE; MSIE 5.0; WINDOWS 98; DIGEXT) | ADRIAN | XXXXXXXXXXXXXXXX |
| 594 | 30-Jan-02 | 30-Jan-02 | PUR.COM | MOZILLA/4.0 (COMPATIBLE; MSIE 5.0; WINDOWS 98; DIGEXT) | MUSTAFA | XXXXXXXXXXXXXXXX |
| 601 | 01-Feb-02 | 02-Feb-02 | BOB@BOB.COM | MOZILLA/4.0 (COMPATIBLE; MSIE 5.0; WINDOWS 98; DIGEXT) | ZALE | XXXXXXXXXXXXXXXX |
| 602 | 01-Feb-02 | 02-Feb-02 | BOB@BOB.COM | MOZILLA/4.0 (COMPATIBLE; MSIE 5.0; WINDOWS 98; DIGEXT) | ZALE | XXXXXXXXXXXXXXXX |
| 602 | 01-Feb-02 | 02-Feb-02 | BOB@BOB.COM | MOZILLA/4.0 (COMPATIBLE; MSIE 5.0; WINDOWS 98; DIGEXT) | ZALE | XXXXXXXXXXXXXXXX |
| 602 | 01-Feb-02 | 02-Feb-02 | BOB@BOB.COM | MOZILLA/4.0 (COMPATIBLE; MSIE 5.0; WINDOWS 98; DIGEXT) | ZALE | XXXXXXXXXXXXXXXX |
| 602 | 01-Feb-02 | 02-Feb-02 | BOB@BOB.COM | MOZILLA/4.0 (COMPATIBLE; MSIE 5.0; WINDOWS 98; DIGEXT) | ZALE | XXXXXXXXXXXXXXXX |
| 601 | 01-Feb-02 | 02-Feb-02 | BOB@BOB.COM | MOZILLA/4.0 (COMPATIBLE; MSIE 5.0; WINDOWS 98; DIGEXT) | ZALE | XXXXXXXXXXXXXXXX |
| 601 | 01-Feb-02 | 02-Feb-02 | BOB@BOB.COM | MOZILLA/4.0 (COMPATIBLE; MSIE 5.0; WINDOWS 98; DIGEXT) | ZALE | XXXXXXXXXXXXXXXX |
| 601 | 01-Feb-02 | 02-Feb-02 | BOB@BOB.COM | MOZILLA/4.0 (COMPATIBLE; MSIE 5.0; WINDOWS 98; DIGEXT) | ZALE | XXXXXXXXXXXXXXXX |
| 601 | 01-Feb-02 | 02-Feb-02 | BOB@BOB.COM | MOZILLA/4.0 (COMPATIBLE; MSIE 5.0; WINDOWS 98; DIGEXT) | ZALE | XXXXXXXXXXXXXXXX |
| 601 | 01-Feb-02 | 02-Feb-02 | BOB@BOB.COM | MOZILLA/4.0 (COMPATIBLE; MSIE 5.0; WINDOWS 98; DIGEXT) | ZALE | XXXXXXXXXXXXXXXX |
| 601 | 01-Feb-02 | 02-Feb-02 | BOB@BOB.COM | MOZILLA/4.0 (COMPATIBLE; MSIE 5.0; WINDOWS 98; DIGEXT) | ZALE | XXXXXXXXXXXXXXXX |
| 601 | 01-Feb-02 | 02-Feb-02 | BOB@BOB.COM | MOZILLA/4.0 (COMPATIBLE; MSIE 5.0; WINDOWS 98; DIGEXT) | ZALE | XXXXXXXXXXXXXXXX |
| 601 | 01-Feb-02 | 02-Feb-02 | BOB@BOB.COM | MOZILLA/4.0 (COMPATIBLE; MSIE 5.0; WINDOWS 98; DIGEXT) | ZALE | XXXXXXXXXXXXXXXX |
| 602 | 01-Feb-02 | 02-Feb-02 | BOB@BOB.COM | MOZILLA/4.0 (COMPATIBLE; MSIE 5.0; WINDOWS 98; DIGEXT) | ZALE | XXXXXXXXXXXXXXXX |
| 601 | 01-Feb-02 | 02-Feb-02 | BOB@BOB.COM | MOZILLA/4.0 (COMPATIBLE; MSIE 5.0; WINDOWS 98; DIGEXT) | ZALE | XXXXXXXXXXXXXXXX |
| 601 | 01-Feb-02 | 02-Feb-02 | BOB@BOB.COM | MOZILLA/4.0 (COMPATIBLE; MSIE 5.0; WINDOWS 98; DIGEXT) | ZALE | XXXXXXXXXXXXXXXX |
| 601 | 01-Feb-02 | 02-Feb-02 | BOB@BOB.COM | MOZILLA/4.0 (COMPATIBLE; MSIE 5.0; WINDOWS 98; DIGEXT) | ZALE | XXXXXXXXXXXXXXXX |
| 602 | 01-Feb-02 | 02-Feb-02 | BOB@BOB.COM | MOZILLA/4.0 (COMPATIBLE; MSIE 5.0; WINDOWS 98; DIGEXT) | ZALE | XXXXXXXXXXXXXXXX |
| 601 | 01-Feb-02 | 02-Feb-02 | BOB@BOB.COM | MOZILLA/4.0 (COMPATIBLE; MSIE 5.0; WINDOWS 98; DIGEXT) | ZALE | XXXXXXXXXXXXXXXX |
| 601 | 01-Feb-02 | 02-Feb-02 | BOB@BOB.COM | MOZILLA/4.0 (COMPATIBLE; MSIE 5.0; WINDOWS 98; DIGEXT) | ZALE | XXXXXXXXXXXXXXXX |
| 601 | 05-Feb-02 | 05-Feb-02 | ELENOR@ELENOR.COM | MOZILLA/4.0 (COMPATIBLE; MSIE 5.0; WINDOWS 98; DIGEXT) | CORK | XXXXXXXXXXXXXXXX |
| 601 | 05-Feb-02 | 05-Feb-02 | ELENOR@ELENOR.COM | MOZILLA/4.0 (COMPATIBLE; MSIE 5.0; WINDOWS 98; DIGEXT) | CORK | XXXXXXXXXXXXXXXX |
| 601 | 05-Feb-02 | 05-Feb-02 | ELENOR@ELENOR.COM | MOZILLA/4.0 (COMPATIBLE; MSIE 5.0; WINDOWS 98; DIGEXT) | CORK | XXXXXXXXXXXXXXXX |
| 601 | 05-Feb-02 | 05-Feb-02 | ELENOR@ELENOR.COM | MOZILLA/4.0 (COMPATIBLE; MSIE 5.0; WINDOWS 98; DIGEXT) | CORK | XXXXXXXXXXXXXXXX |

FIG. 1-A

| TimeDiff | ORDERTIME | CUSTLOCAL TIME | EMAIL | BROWSERID | CARD HOLDER | CARD NUMBER |
|---|---|---|---|---|---|---|
| 601 | 05-Feb-02 | 05-Feb-02 | ELENOR@ELENOR.COM | MOZILLA/4.0 (COMPATIBLE; MSIE 5.0; WINDOWS 98; DIGEXT) | CORK | XXXXXXXXXXXXXXXX |
| 599 | 06-Feb-02 | 07-Feb-02 | O.COM | MOZILLA/4.0 (COMPATIBLE; MSIE 5.0; WINDOWS 98; DIGEXT) | FRITZ | XXXXXXXXXXXXXXXX |
| 599 | 06-Feb-02 | 07-Feb-02 | O.COM | MOZILLA/4.0 (COMPATIBLE; MSIE 5.0; WINDOWS 98; DIGEXT) | FRITZ | XXXXXXXXXXXXXXXX |
| 599 | 06-Feb-02 | 07-Feb-02 | O.COM | MOZILLA/4.0 (COMPATIBLE; MSIE 5.0; WINDOWS 98; DIGEXT) | FRITZ | XXXXXXXXXXXXXXXX |
| 599 | 06-Feb-02 | 07-Feb-02 | O.COM | MOZILLA/4.0 (COMPATIBLE; MSIE 5.0; WINDOWS 98; DIGEXT) | FRITZ | XXXXXXXXXXXXXXXX |
| 599 | 06-Feb-02 | 07-Feb-02 | O.COM | MOZILLA/4.0 (COMPATIBLE; MSIE 5.0; WINDOWS 98; DIGEXT) | FRITZ | XXXXXXXXXXXXXXXX |
| 599 | 06-Feb-02 | 07-Feb-02 | O.COM | MOZILLA/4.0 (COMPATIBLE; MSIE 5.0; WINDOWS 98; DIGEXT) | FRITZ | XXXXXXXXXXXXXXXX |
| 599 | 06-Feb-02 | 07-Feb-02 | O.COM | MOZILLA/4.0 (COMPATIBLE; MSIE 5.0; WINDOWS 98; DIGEXT) | FRITZ | XXXXXXXXXXXXXXXX |
| 605 | 09-Feb-02 | 09-Feb-02 | M | MOZILLA/4.0 (COMPATIBLE; MSIE 5.0; WINDOWS 98; DIGEXT) | ADRIAN | XXXXXXXXXXXXXXXX |
| 605 | 09-Feb-02 | 09-Feb-02 | M | MOZILLA/4.0 (COMPATIBLE; MSIE 5.0; WINDOWS 98; DIGEXT) | ADRIAN | XXXXXXXXXXXXXXXX |
| 605 | 09-Feb-02 | 09-Feb-02 | M | MOZILLA/4.0 (COMPATIBLE; MSIE 5.0; WINDOWS 98; DIGEXT) | ADRIAN | XXXXXXXXXXXXXXXX |
| 605 | 09-Feb-02 | 09-Feb-02 | M | MOZILLA/4.0 (COMPATIBLE; MSIE 5.0; WINDOWS 98; DIGEXT) | ADRIAN | XXXXXXXXXXXXXXXX |
| 605 | 09-Feb-02 | 09-Feb-02 | M | MOZILLA/4.0 (COMPATIBLE; MSIE 5.0; WINDOWS 98; DIGEXT) | ADRIAN | XXXXXXXXXXXXXXXX |
| 605 | 09-Feb-02 | 09-Feb-02 | M | MOZILLA/4.0 (COMPATIBLE; MSIE 5.0; WINDOWS 98; DIGEXT) | ADRIAN | XXXXXXXXXXXXXXXX |
| 605 | 09-Feb-02 | 09-Feb-02 | M | MOZILLA/4.0 (COMPATIBLE; MSIE 5.0; WINDOWS 98; DIGEXT) | ADRIAN | XXXXXXXXXXXXXXXX |
| 605 | 09-Feb-02 | 09-Feb-02 | M | MOZILLA/4.0 (COMPATIBLE; MSIE 5.0; WINDOWS 98; DIGEXT) | ADRIAN | XXXXXXXXXXXXXXXX |
| 605 | 09-Feb-02 | 09-Feb-02 | M | MOZILLA/4.0 (COMPATIBLE; MSIE 5.0; WINDOWS 98; DIGEXT) | ADRIAN | XXXXXXXXXXXXXXXX |
| 605 | 09-Feb-02 | 09-Feb-02 | M | MOZILLA/4.0 (COMPATIBLE; MSIE 5.0; WINDOWS 98; DIGEXT) | ADRIAN | XXXXXXXXXXXXXXXX |
| 604 | 09-Feb-02 | 09-Feb-02 | M | MOZILLA/4.0 (COMPATIBLE; MSIE 5.0; WINDOWS 98; DIGEXT) | ADRIAN | XXXXXXXXXXXXXXXX |
| 604 | 09-Feb-02 | 09-Feb-02 | M | MOZILLA/4.0 (COMPATIBLE; MSIE 5.0; WINDOWS 98; DIGEXT) | ADRIAN | XXXXXXXXXXXXXXXX |
| 604 | 09-Feb-02 | 09-Feb-02 | M | MOZILLA/4.0 (COMPATIBLE; MSIE 5.0; WINDOWS 98; DIGEXT) | ADRIAN | XXXXXXXXXXXXXXXX |
| 594 | 08-Feb-02 | 08-Feb-02 | KAY@KAY.COM | MOZILLA/4.0 (COMPATIBLE; MSIE 5.0; WINDOWS 98; DIGEXT) | GABRIEL | XXXXXXXXXXXXXXXX |
| 594 | 08-Feb-02 | 08-Feb-02 | KAY@KAY.COM | MOZILLA/4.0 (COMPATIBLE; MSIE 5.0; WINDOWS 98; DIGEXT) | GABRIEL | XXXXXXXXXXXXXXXX |
| 594 | 08-Feb-02 | 08-Feb-02 | KAY@KAY.COM | MOZILLA/4.0 (COMPATIBLE; MSIE 5.0; WINDOWS 98; DIGEXT) | GABRIEL | XXXXXXXXXXXXXXXX |
| 594 | 08-Feb-02 | 08-Feb-02 | KAY@KAY.COM | MOZILLA/4.0 (COMPATIBLE; MSIE 5.0; WINDOWS 98; DIGEXT) | GABRIEL | XXXXXXXXXXXXXXXX |
| 594 | 08-Feb-02 | 08-Feb-02 | KAY@KAY.COM | MOZILLA/4.0 (COMPATIBLE; MSIE 5.0; WINDOWS 98; DIGEXT) | GABRIEL | XXXXXXXXXXXXXXXX |
| 594 | 08-Feb-02 | 08-Feb-02 | KAY@KAY.COM | MOZILLA/4.0 (COMPATIBLE; MSIE 5.0; WINDOWS 98; DIGEXT) | GABRIEL | XXXXXXXXXXXXXXXX |
| 594 | 08-Feb-02 | 08-Feb-02 | KAY@KAY.COM | MOZILLA/4.0 (COMPATIBLE; MSIE 5.0; WINDOWS 98; DIGEXT) | GABRIEL | XXXXXXXXXXXXXXXX |
| 594 | 08-Feb-02 | 08-Feb-02 | KAY@KAY.COM | MOZILLA/4.0 (COMPATIBLE; MSIE 5.0; WINDOWS 98; DIGEXT) | GABRIEL | XXXXXXXXXXXXXXXX |
| 594 | 08-Feb-02 | 08-Feb-02 | KAY@KAY.COM | MOZILLA/4.0 (COMPATIBLE; MSIE 5.0; WINDOWS 98; DIGEXT) | GABRIEL | XXXXXXXXXXXXXXXX |
| 594 | 08-Feb-02 | 08-Feb-02 | KAY@KAY.COM | MOZILLA/4.0 (COMPATIBLE; MSIE 5.0; WINDOWS 98; DIGEXT) | GABRIEL | XXXXXXXXXXXXXXXX |
| 598 | 08-Feb-02 | 08-Feb-02 | MARIANE@MARIANE.COM | MOZILLA/4.0 (COMPATIBLE; MSIE 5.0; WINDOWS 98; DIGEXT) | GABRIEL | XXXXXXXXXXXXXXXX |
| 598 | 08-Feb-02 | 08-Feb-02 | MARIANE@MARIANE.COM | MOZILLA/4.0 (COMPATIBLE; MSIE 5.0; WINDOWS 98; DIGEXT) | GABRIEL | XXXXXXXXXXXXXXXX |
| 598 | 08-Feb-02 | 08-Feb-02 | MARIANE@MARIANE.COM | MOZILLA/4.0 (COMPATIBLE; MSIE 5.0; WINDOWS 98; DIGEXT) | GABRIEL | XXXXXXXXXXXXXXXX |
| 598 | 08-Feb-02 | 08-Feb-02 | MARIANE@MARIANE.COM | MOZILLA/4.0 (COMPATIBLE; MSIE 5.0; WINDOWS 98; DIGEXT) | GABRIEL | XXXXXXXXXXXXXXXX |
| 598 | 08-Feb-02 | 08-Feb-02 | MARIANE@MARIANE.COM | MOZILLA/4.0 (COMPATIBLE; MSIE 5.0; WINDOWS 98; DIGEXT) | GABRIEL | XXXXXXXXXXXXXXXX |
| 598 | 08-Feb-02 | 08-Feb-02 | MARIANE@MARIANE.COM | MOZILLA/4.0 (COMPATIBLE; MSIE 5.0; WINDOWS 98; DIGEXT) | GABRIEL | XXXXXXXXXXXXXXXX |
| 598 | 08-Feb-02 | 08-Feb-02 | MARIANE@MARIANE.COM | MOZILLA/4.0 (COMPATIBLE; MSIE 5.0; WINDOWS 98; DIGEXT) | GABRIEL | XXXXXXXXXXXXXXXX |
| 598 | 08-Feb-02 | 08-Feb-02 | MARIANE@MARIANE.COM | MOZILLA/4.0 (COMPATIBLE; MSIE 5.0; WINDOWS 98; DIGEXT) | GABRIEL | XXXXXXXXXXXXXXXX |
| 598 | 08-Feb-02 | 08-Feb-02 | MARIANE@MARIANE.COM | MOZILLA/4.0 (COMPATIBLE; MSIE 5.0; WINDOWS 98; DIGEXT) | GABRIEL | XXXXXXXXXXXXXXXX |
| 598 | 08-Feb-02 | 08-Feb-02 | MARIANE@MARIANE.COM | MOZILLA/4.0 (COMPATIBLE; MSIE 5.0; WINDOWS 98; DIGEXT) | GABRIEL | XXXXXXXXXXXXXXXX |

FIG. 1-B

| TimeDiff | ORDERTIME | CUSTLOCAL TIME | EMAIL | BROWSERID | CARD HOLDER | CARD NUMBER |
|---|---|---|---|---|---|---|
| 598 | 08-Feb-02 | 08-Feb-02 | MARIANE@MARIANE.COM | MOZILLA/4.0 (COMPATIBLE; MSIE 5.0; WINDOWS 98; DIGEXT) | GABRIEL | XXXXXXXXXXXXXXXX |
| 598 | 08-Feb-02 | 08-Feb-02 | MARIANE@MARIANE.COM | MOZILLA/4.0 (COMPATIBLE; MSIE 5.0; WINDOWS 98; DIGEXT) | GABRIEL | XXXXXXXXXXXXXXXX |
| 598 | 08-Feb-02 | 08-Feb-02 | MARIANE@MARIANE.COM | MOZILLA/4.0 (COMPATIBLE; MSIE 5.0; WINDOWS 98; DIGEXT) | GABRIEL | XXXXXXXXXXXXXXXX |
| 598 | 08-Feb-02 | 08-Feb-02 | MARIANE@MARIANE.COM | MOZILLA/4.0 (COMPATIBLE; MSIE 5.0; WINDOWS 98; DIGEXT) | GABRIEL | XXXXXXXXXXXXXXXX |
| 598 | 08-Feb-02 | 08-Feb-02 | MARIANE@MARIANE.COM | MOZILLA/4.0 (COMPATIBLE; MSIE 5.0; WINDOWS 98; DIGEXT) | GABRIEL | XXXXXXXXXXXXXXXX |
| 598 | 08-Feb-02 | 08-Feb-02 | MARIANE@MARIANE.COM | MOZILLA/4.0 (COMPATIBLE; MSIE 5.0; WINDOWS 98; DIGEXT) | GABRIEL | XXXXXXXXXXXXXXXX |
| 598 | 08-Feb-02 | 08-Feb-02 | MARIANE@MARIANE.COM | MOZILLA/4.0 (COMPATIBLE; MSIE 5.0; WINDOWS 98; DIGEXT) | GABRIEL | XXXXXXXXXXXXXXXX |
| 598 | 08-Feb-02 | 08-Feb-02 | MARIANE@MARIANE.COM | MOZILLA/4.0 (COMPATIBLE; MSIE 5.0; WINDOWS 98; DIGEXT) | GABRIEL | XXXXXXXXXXXXXXXX |
| 598 | 08-Feb-02 | 08-Feb-02 | MARIANE@MARIANE.COM | MOZILLA/4.0 (COMPATIBLE; MSIE 5.0; WINDOWS 98; DIGEXT) | GABRIEL | XXXXXXXXXXXXXXXX |
| 598 | 08-Feb-02 | 08-Feb-02 | MARIANE@MARIANE.COM | MOZILLA/4.0 (COMPATIBLE; MSIE 5.0; WINDOWS 98; DIGEXT) | GABRIEL | XXXXXXXXXXXXXXXX |
| 598 | 08-Feb-02 | 08-Feb-02 | MARIANE@MARIANE.COM | MOZILLA/4.0 (COMPATIBLE; MSIE 5.0; WINDOWS 98; DIGEXT) | GABRIEL | XXXXXXXXXXXXXXXX |
| 598 | 08-Feb-02 | 08-Feb-02 | MARIANE@MARIANE.COM | MOZILLA/4.0 (COMPATIBLE; MSIE 5.0; WINDOWS 98; DIGEXT) | GABRIEL | XXXXXXXXXXXXXXXX |
| 598 | 08-Feb-02 | 08-Feb-02 | MARIANE@MARIANE.COM | MOZILLA/4.0 (COMPATIBLE; MSIE 5.0; WINDOWS 98; DIGEXT) | GABRIEL | XXXXXXXXXXXXXXXX |
| 598 | 08-Feb-02 | 08-Feb-02 | MARIANE@MARIANE.COM | MOZILLA/4.0 (COMPATIBLE; MSIE 5.0; WINDOWS 98; DIGEXT) | GABRIEL | XXXXXXXXXXXXXXXX |
| 598 | 08-Feb-02 | 08-Feb-02 | MARIANE@MARIANE.COM | MOZILLA/4.0 (COMPATIBLE; MSIE 5.0; WINDOWS 98; DIGEXT) | GABRIEL | XXXXXXXXXXXXXXXX |
| 598 | 08-Feb-02 | 08-Feb-02 | MARIANE@MARIANE.COM | MOZILLA/4.0 (COMPATIBLE; MSIE 5.0; WINDOWS 98; DIGEXT) | GABRIEL | XXXXXXXXXXXXXXXX |
| 598 | 08-Feb-02 | 08-Feb-02 | MARIANE@MARIANE.COM | MOZILLA/4.0 (COMPATIBLE; MSIE 5.0; WINDOWS 98; DIGEXT) | GABRIEL | XXXXXXXXXXXXXXXX |
| 598 | 08-Feb-02 | 08-Feb-02 | MARIANE@MARIANE.COM | MOZILLA/4.0 (COMPATIBLE; MSIE 5.0; WINDOWS 98; DIGEXT) | GABRIEL | XXXXXXXXXXXXXXXX |
| 598 | 08-Feb-02 | 08-Feb-02 | MARIANE@MARIANE.COM | MOZILLA/4.0 (COMPATIBLE; MSIE 5.0; WINDOWS 98; DIGEXT) | GABRIEL | XXXXXXXXXXXXXXXX |
| 598 | 08-Feb-02 | 08-Feb-02 | MARIANE@MARIANE.COM | MOZILLA/4.0 (COMPATIBLE; MSIE 5.0; WINDOWS 98; DIGEXT) | GABRIEL | XXXXXXXXXXXXXXXX |
| 598 | 08-Feb-02 | 08-Feb-02 | MARIANE@MARIANE.COM | MOZILLA/4.0 (COMPATIBLE; MSIE 5.0; WINDOWS 98; DIGEXT) | GABRIEL | XXXXXXXXXXXXXXXX |
| 598 | 08-Feb-02 | 08-Feb-02 | MARIANE@MARIANE.COM | MOZILLA/4.0 (COMPATIBLE; MSIE 5.0; WINDOWS 98; DIGEXT) | GABRIEL | XXXXXXXXXXXXXXXX |
| 598 | 08-Feb-02 | 08-Feb-02 | MARIANE@MARIANE.COM | MOZILLA/4.0 (COMPATIBLE; MSIE 5.0; WINDOWS 98; DIGEXT) | GABRIEL | XXXXXXXXXXXXXXXX |
| 598 | 08-Feb-02 | 08-Feb-02 | MARIANE@MARIANE.COM | MOZILLA/4.0 (COMPATIBLE; MSIE 5.0; WINDOWS 98; DIGEXT) | GABRIEL | XXXXXXXXXXXXXXXX |
| 598 | 08-Feb-02 | 08-Feb-02 | MARIANE@MARIANE.COM | MOZILLA/4.0 (COMPATIBLE; MSIE 5.0; WINDOWS 98; DIGEXT) | GABRIEL | XXXXXXXXXXXXXXXX |
| 598 | 08-Feb-02 | 08-Feb-02 | MARIANE@MARIANE.COM | MOZILLA/4.0 (COMPATIBLE; MSIE 5.0; WINDOWS 98; DIGEXT) | GABRIEL | XXXXXXXXXXXXXXXX |
| 598 | 08-Feb-02 | 08-Feb-02 | MARIANE@MARIANE.COM | MOZILLA/4.0 (COMPATIBLE; MSIE 5.0; WINDOWS 98; DIGEXT) | GABRIEL | XXXXXXXXXXXXXXXX |
| 598 | 08-Feb-02 | 08-Feb-02 | MARIANE@MARIANE.COM | MOZILLA/4.0 (COMPATIBLE; MSIE 5.0; WINDOWS 98; DIGEXT) | GABRIEL | XXXXXXXXXXXXXXXX |
| 598 | 08-Feb-02 | 08-Feb-02 | MARIANE@MARIANE.COM | MOZILLA/4.0 (COMPATIBLE; MSIE 5.0; WINDOWS 98; DIGEXT) | GABRIEL | XXXXXXXXXXXXXXXX |
| 598 | 08-Feb-02 | 08-Feb-02 | MARIANE@MARIANE.COM | MOZILLA/4.0 (COMPATIBLE; MSIE 5.0; WINDOWS 98; DIGEXT) | GABRIEL | XXXXXXXXXXXXXXXX |
| 598 | 08-Feb-02 | 08-Feb-02 | MARIANE@MARIANE.COM | MOZILLA/4.0 (COMPATIBLE; MSIE 5.0; WINDOWS 98; DIGEXT) | GABRIEL | XXXXXXXXXXXXXXXX |
| 598 | 08-Feb-02 | 08-Feb-02 | MARIANE@MARIANE.COM | MOZILLA/4.0 (COMPATIBLE; MSIE 5.0; WINDOWS 98; DIGEXT) | GABRIEL | XXXXXXXXXXXXXXXX |
| 598 | 08-Feb-02 | 08-Feb-02 | MARIANE@MARIANE.COM | MOZILLA/4.0 (COMPATIBLE; MSIE 5.0; WINDOWS 98; DIGEXT) | GABRIEL | XXXXXXXXXXXXXXXX |
| 598 | 08-Feb-02 | 08-Feb-02 | MARIANE@MARIANE.COM | MOZILLA/4.0 (COMPATIBLE; MSIE 5.0; WINDOWS 98; DIGEXT) | GABRIEL | XXXXXXXXXXXXXXXX |
| 598 | 08-Feb-02 | 08-Feb-02 | MARIANE@MARIANE.COM | MOZILLA/4.0 (COMPATIBLE; MSIE 5.0; WINDOWS 98; DIGEXT) | GABRIEL | XXXXXXXXXXXXXXXX |
| 598 | 08-Feb-02 | 08-Feb-02 | MARIANE@MARIANE.COM | MOZILLA/4.0 (COMPATIBLE; MSIE 5.0; WINDOWS 98; DIGEXT) | GABRIEL | XXXXXXXXXXXXXXXX |
| 598 | 08-Feb-02 | 08-Feb-02 | MARIANE@MARIANE.COM | MOZILLA/4.0 (COMPATIBLE; MSIE 5.0; WINDOWS 98; DIGEXT) | GABRIEL | XXXXXXXXXXXXXXXX |
| 598 | 08-Feb-02 | 08-Feb-02 | MARIANE@MARIANE.COM | MOZILLA/4.0 (COMPATIBLE; MSIE 5.0; WINDOWS 98; DIGEXT) | GABRIEL | XXXXXXXXXXXXXXXX |
| 598 | 08-Feb-02 | 08-Feb-02 | MARIANE@MARIANE.COM | MOZILLA/4.0 (COMPATIBLE; MSIE 5.0; WINDOWS 98; DIGEXT) | GABRIEL | XXXXXXXXXXXXXXXX |
| 598 | 08-Feb-02 | 08-Feb-02 | MARIANE@MARIANE.COM | MOZILLA/4.0 (COMPATIBLE; MSIE 5.0; WINDOWS 98; DIGEXT) | GABRIEL | XXXXXXXXXXXXXXXX |
| 598 | 08-Feb-02 | 08-Feb-02 | MARIANE@MARIANE.COM | MOZILLA/4.0 (COMPATIBLE; MSIE 5.0; WINDOWS 98; DIGEXT) | GABRIEL | XXXXXXXXXXXXXXXX |
| 598 | 08-Feb-02 | 08-Feb-02 | MARIANE@MARIANE.COM | MOZILLA/4.0 (COMPATIBLE; MSIE 5.0; WINDOWS 98; DIGEXT) | GABRIEL | XXXXXXXXXXXXXXXX |
| 598 | 08-Feb-02 | 08-Feb-02 | MARIANE@MARIANE.COM | MOZILLA/4.0 (COMPATIBLE; MSIE 5.0; WINDOWS 98; DIGEXT) | GABRIEL | XXXXXXXXXXXXXXXX |
| 598 | 08-Feb-02 | 08-Feb-02 | MARIANE@MARIANE.COM | MOZILLA/4.0 (COMPATIBLE; MSIE 5.0; WINDOWS 98; DIGEXT) | GABRIEL | XXXXXXXXXXXXXXXX |
| 598 | 08-Feb-02 | 08-Feb-02 | MARIANE@MARIANE.COM | MOZILLA/4.0 (COMPATIBLE; MSIE 5.0; WINDOWS 98; DIGEXT) | GABRIEL | XXXXXXXXXXXXXXXX |
| 598 | 08-Feb-02 | 08-Feb-02 | MARIANE@MARIANE.COM | MOZILLA/4.0 (COMPATIBLE; MSIE 5.0; WINDOWS 98; DIGEXT) | GABRIEL | XXXXXXXXXXXXXXXX |
| 598 | 08-Feb-02 | 08-Feb-02 | MARIANE@MARIANE.COM | MOZILLA/4.0 (COMPATIBLE; MSIE 5.0; WINDOWS 98; DIGEXT) | GABRIEL | XXXXXXXXXXXXXXXX |
| 598 | 08-Feb-02 | 08-Feb-02 | MARIANE@MARIANE.COM | MOZILLA/4.0 (COMPATIBLE; MSIE 5.0; WINDOWS 98; DIGEXT) | GABRIEL | XXXXXXXXXXXXXXXX |
| 598 | 08-Feb-02 | 08-Feb-02 | MARIANE@MARIANE.COM | MOZILLA/4.0 (COMPATIBLE; MSIE 5.0; WINDOWS 98; DIGEXT) | GABRIEL | XXXXXXXXXXXXXXXX |
| 598 | 08-Feb-02 | 08-Feb-02 | MARIANE@MARIANE.COM | MOZILLA/4.0 (COMPATIBLE; MSIE 5.0; WINDOWS 98; DIGEXT) | GABRIEL | XXXXXXXXXXXXXXXX |
| 598 | 08-Feb-02 | 08-Feb-02 | MARIANE@MARIANE.COM | MOZILLA/4.0 (COMPATIBLE; MSIE 5.0; WINDOWS 98; DIGEXT) | GABRIEL | XXXXXXXXXXXXXXXX |
| 598 | 08-Feb-02 | 08-Feb-02 | MARIANE@MARIANE.COM | MOZILLA/4.0 (COMPATIBLE; MSIE 5.0; WINDOWS 98; DIGEXT) | GABRIEL | XXXXXXXXXXXXXXXX |
| 598 | 08-Feb-02 | 08-Feb-02 | MARIANE@MARIANE.COM | MOZILLA/4.0 (COMPATIBLE; MSIE 5.0; WINDOWS 98; DIGEXT) | GABRIEL | XXXXXXXXXXXXXXXX |
| 598 | 08-Feb-02 | 08-Feb-02 | MARIANE@MARIANE.COM | MOZILLA/4.0 (COMPATIBLE; MSIE 5.0; WINDOWS 98; DIGEXT) | GABRIEL | XXXXXXXXXXXXXXXX |

FIG. 1-C

| TimeDiff | ORDERTIME | CUSTLOCAL TIME | EMAIL | BROWSERID | CARD HOLDER | CARD NUMBER |
|---|---|---|---|---|---|---|
| 598 | 08-Feb-02 | 08-Feb-02 | MARIANE@MARIANE.COM | MOZILLA/4.0 (COMPATIBLE; MSIE 5.0; WINDOWS 98; DIGEXT) | GABRIEL | XXXXXXXXXXXXXXXX |
| 603 | 08-Feb-02 | 09-Feb-02 | GABRIEL@GABRIEL.COM | MOZILLA/4.0 (COMPATIBLE; MSIE 5.0; WINDOWS 98; DIGEXT) | GABRIEL | XXXXXXXXXXXXXXXX |
| 598 | 08-Feb-02 | 08-Feb-02 | MARIANE@MARIANE.COM | MOZILLA/4.0 (COMPATIBLE; MSIE 5.0; WINDOWS 98; DIGEXT) | GABRIEL | XXXXXXXXXXXXXXXX |
| 598 | 08-Feb-02 | 08-Feb-02 | MARIANE@MARIANE.COM | MOZILLA/4.0 (COMPATIBLE; MSIE 5.0; WINDOWS 98; DIGEXT) | GABRIEL | XXXXXXXXXXXXXXXX |
| 602 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 602 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 602 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 602 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 603 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 602 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 602 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 602 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 603 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 602 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 602 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 602 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 603 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 603 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 603 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 603 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 603 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 603 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 603 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 603 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 603 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 602 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 603 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 602 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 602 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 603 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 603 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 603 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 602 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 602 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 603 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 603 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 602 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 603 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 603 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 602 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 603 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 603 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 602 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 603 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 602 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 602 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 602 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 602 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 602 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |

FIG. 1-D

| TimeDiff | ORDERTIME | CUSTLOCAL TIME | EMAIL | BROWSERID | CARD HOLDER | CARD NUMBER |
|---|---|---|---|---|---|---|
| 602 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 602 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 602 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 602 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 602 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 602 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 602 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 602 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 603 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 603 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 603 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 602 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 602 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 602 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 602 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 602 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 602 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 602 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 603 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 603 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 603 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 603 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 603 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 603 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 603 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 603 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 603 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 603 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 603 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 603 | 08-Feb^02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 603 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 603 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 603 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 602 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 603 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 603 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 603 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 603 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 603 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 603 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 603 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 603 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 602 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 603 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 602 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 602 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 603 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 603 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 602 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 603 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |

FIG. 1-E

| TimeDiff | ORDERTIME | CUSTLOCAL TIME | EMAIL | BROWSERID | CARD HOLDER | CARD NUMBER |
|---|---|---|---|---|---|---|
| 603 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 603 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 603 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 603 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 603 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 603 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 603 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 603 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 603 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 603 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 603 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 603 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 603 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 603 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 603 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 603 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 603 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 603 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 603 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 603 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 603 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 603 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 603 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 603 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 603 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 603 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 603 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 602 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 602 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 602 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 602 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 602 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 602 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 602 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 602 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 602 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 602 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 602 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 602 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 602 | 08-Feb-02 | 09-Feb-02 | GABRIEL@GABRIEL.COM | MOZILLA/4.0 (COMPATIBLE; MSIE 5.0; WINDOWS 98; DIGEXT) | CORK | XXXXXXXXXXXXXXXX |
| 602 | 08-Feb-02 | 09-Feb-02 | GABRIEL@GABRIEL.COM | MOZILLA/4.0 (COMPATIBLE; MSIE 5.0; WINDOWS 98; DIGEXT) | IMRAN | XXXXXXXXXXXXXXXX |
| 602 | 05-Mar-02 | 05-Mar-02 | M | MOZILLA/4.0 (COMPATIBLE; MSIE 5.0; WINDOWS 98; DIGEXT) | FRITZ | XXXXXXXXXXXXXXXX |
| 597 | 14-Feb-02 | 15-Feb-02 | O.COM | MOZILLA/4.0 (COMPATIBLE; MSIE 5.0; WINDOWS 98; DIGEXT) | FRITZ | XXXXXXXXXXXXXXXX |
| 597 | 14-Feb-02 | 15-Feb-02 | O.COM | MOZILLA/4.0 (COMPATIBLE; MSIE 5.0; WINDOWS 98; DIGEXT) | FRITZ | XXXXXXXXXXXXXXXX |
| 597 | 14-Feb-02 | 15-Feb-02 | O.COM | MOZILLA/4.0 (COMPATIBLE; MSIE 5.0; WINDOWS 98; DIGEXT) | FRITZ | XXXXXXXXXXXXXXXX |
| 598 | 02-Mar-02 | 02-Mar-02 | SKAIFI@SKAIFI.COM | MOZILLA/4.0 (COMPATIBLE; MSIE 5.0; WINDOWS 98; DIGEXT) | KAIFI | XXXXXXXXXXXXXXXX |
| 609 | 09-Mar-02 | 09-Mar-02 | IMOLTA@IMOLTA.COM | MOZILLA/4.0 (COMPATIBLE; MSIE 5.0; WINDOWS 98; DIGEXT) | MITCHELL | XXXXXXXXXXXXXXXX |
| 609 | 09-Mar-02 | 09-Mar-02 | IMOLTA@IMOLTA.COM | MOZILLA/4.0 (COMPATIBLE; MSIE 5.0; WINDOWS 98; DIGEXT) | MITCHELL | XXXXXXXXXXXXXXXX |
| 609 | 09-Mar-02 | 09-Mar-02 | IMOLTA@IMOLTA.COM | MOZILLA/4.0 (COMPATIBLE; MSIE 5.0; WINDOWS 98; DIGEXT) | MITCHELL | XXXXXXXXXXXXXXXX |

FIG. 1-F

| TimeDiff | ORDERTIME | CUSTLOCAL TIME | EMAIL | BROWSERID | CARD HOLDER | CARD NUMBER |
|---|---|---|---|---|---|---|
| 609 | 09-Mar-02 | 09-Mar-02 | IMOLTA@IMOLTA.COM | MOZILLA/4.0 (COMPATIBLE; MSIE 5.0; WINDOWS 98; DIGEXT) | MITCHELL | XXXXXXXXXXXXXXXX |
| 609 | 09-Mar-02 | 09-Mar-02 | IMOLTA@IMOLTA.COM | MOZILLA/4.0 (COMPATIBLE; MSIE 5.0; WINDOWS 98; DIGEXT) | MITCHELL | XXXXXXXXXXXXXXXX |
| 609 | 09-Mar-02 | 09-Mar-02 | IMOLTA@IMOLTA.COM | MOZILLA/4.0 (COMPATIBLE; MSIE 5.0; WINDOWS 98; DIGEXT) | MITCHELL | XXXXXXXXXXXXXXXX |
| 597 | 09-Mar-02 | 09-Mar-02 | MOZAK440@MOZAK440.COM | MOZILLA/4.0 (COMPATIBLE; MSIE 5.0; WINDOWS 98; DIGEXT) | DAVID | XXXXXXXXXXXXXXXX |
| 600 | 16-Mar-02 | 16-Mar-02 | M | MOZILLA/4.0 (COMPATIBLE; MSIE 5.0; WINDOWS 98; DIGEXT) | STEVE | XXXXXXXXXXXXXXXX |
| 600 | 16-Mar-02 | 16-Mar-02 | M | MOZILLA/4.0 (COMPATIBLE; MSIE 5.0; WINDOWS 98; DIGEXT) | STEVE | XXXXXXXXXXXXXXXX |
| 600 | 16-Mar-02 | 16-Mar-02 | M | MOZILLA/4.0 (COMPATIBLE; MSIE 5.0; WINDOWS 98; DIGEXT) | STEVE | XXXXXXXXXXXXXXXX |
| 600 | 16-Mar-02 | 16-Mar-02 | M | MOZILLA/4.0 (COMPATIBLE; MSIE 5.0; WINDOWS 98; DIGEXT) | STEVE | XXXXXXXXXXXXXXXX |
| 600 | 16-Mar-02 | 16-Mar-02 | M | MOZILLA/4.0 (COMPATIBLE; MSIE 5.0; WINDOWS 98; DIGEXT) | STEVE | XXXXXXXXXXXXXXXX |
| 600 | 16-Mar-02 | 16-Mar-02 | M | MOZILLA/4.0 (COMPATIBLE; MSIE 5.0; WINDOWS 98; DIGEXT) | STEVE | XXXXXXXXXXXXXXXX |
| 600 | 16-Mar-02 | 16-Mar-02 | M | MOZILLA/4.0 (COMPATIBLE; MSIE 5.0; WINDOWS 98; DIGEXT) | STEVE | XXXXXXXXXXXXXXXX |
| 599 | 14-Mar-02 | 14-Mar-02 | RIVERONE21@RIVERONE.COM | MOZILLA/4.0 (COMPATIBLE; MSIE 5.0; WINDOWS 98; DIGEXT) | LEE | XXXXXXXXXXXXXXXX |
| 599 | 14-Mar-02 | 14-Mar-02 | RIVERONE21@RIVERONE.COM | MOZILLA/4.0 (COMPATIBLE; MSIE 5.0; WINDOWS 98; DIGEXT) | LEE | XXXXXXXXXXXXXXXX |
| 599 | 14-Mar-02 | 14-Mar-02 | RIVERONE21@RIVERONE.COM | MOZILLA/4.0 (COMPATIBLE; MSIE 5.0; WINDOWS 98; DIGEXT) | LEE | XXXXXXXXXXXXXXXX |
| 599 | 14-Mar-02 | 14-Mar-02 | RIVERONE21@RIVERONE.COM | MOZILLA/4.0 (COMPATIBLE; MSIE 5.0; WINDOWS 98; DIGEXT) | LEE | XXXXXXXXXXXXXXXX |
| 599 | 14-Mar-02 | 14-Mar-02 | RIVERONE21@RIVERONE.COM | MOZILLA/4.0 (COMPATIBLE; MSIE 5.0; WINDOWS 98; DIGEXT) | LEE | XXXXXXXXXXXXXXXX |
| 599 | 14-Mar-02 | 14-Mar-02 | RIVERONE21@RIVERONE.COM | MOZILLA/4.0 (COMPATIBLE; MSIE 5.0; WINDOWS 98; DIGEXT) | LEE | XXXXXXXXXXXXXXXX |
| 599 | 14-Mar-02 | 14-Mar-02 | RIVERONE21@RIVERONE.COM | MOZILLA/4.0 (COMPATIBLE; MSIE 5.0; WINDOWS 98; DIGEXT) | LEE | XXXXXXXXXXXXXXXX |
| 599 | 14-Mar-02 | 14-Mar-02 | RIVERONE21@RIVERONE.COM | MOZILLA/4.0 (COMPATIBLE; MSIE 5.0; WINDOWS 98; DIGEXT) | LEE | XXXXXXXXXXXXXXXX |
| 599 | 14-Mar-02 | 14-Mar-02 | RIVERONE21@RIVERONE.COM | MOZILLA/4.0 (COMPATIBLE; MSIE 5.0; WINDOWS 98; DIGEXT) | LEE | XXXXXXXXXXXXXXXX |
| 604 | 06-Apr-02 | 06-Apr-02 | SMHATRE@SMHATRE.COM | MOZILLA/4.0 (COMPATIBLE; MSIE 5.0; WINDOWS 98; DIGEXT) | MHATRE | XXXXXXXXXXXXXXXX |
| 604 | 06-Apr-02 | 06-Apr-02 | SMHATRE@SMHATRE.COM | MOZILLA/4.0 (COMPATIBLE; MSIE 5.0; WINDOWS 98; DIGEXT) | MHATRE | XXXXXXXXXXXXXXXX |
| 600 | 09-Mar-02 | 09-Mar-02 | ASPNFILM@ASPNFILM.COM | MOZILLA/4.0 (COMPATIBLE; MSIE 5.0; WINDOWS 98; DIGEXT) | SELLARS | XXXXXXXXXXXXXXXX |
| 600 | 09-Mar-02 | 09-Mar-02 | ASPNFILM@ASPNFILM.COM | MOZILLA/4.0 (COMPATIBLE; MSIE 5.0; WINDOWS 98; DIGEXT) | SELLARS | XXXXXXXXXXXXXXXX |
| 600 | 09-Mar-02 | 09-Mar-02 | ASPNFILM@ASPNFILM.COM | MOZILLA/4.0 (COMPATIBLE; MSIE 5.0; WINDOWS 98; DIGEXT) | SELLARS | XXXXXXXXXXXXXXXX |
| 600 | 09-Mar-02 | 09-Mar-02 | ASPNFILM@ASPNFILM.COM | MOZILLA/4.0 (COMPATIBLE; MSIE 5.0; WINDOWS 98; DIGEXT) | SELLARS | XXXXXXXXXXXXXXXX |
| 597 | 19-Mar-02 | 19-Mar-02 | CAK_MAI@CAK.COM | MOZILLA/4.0 (COMPATIBLE; MSIE 5.0; WINDOWS 98; DIGEXT) | FAIR | XXXXXXXXXXXXXXXX |
| 597 | 19-Mar-02 | 19-Mar-02 | CAK_MAI@CAK.COM | MOZILLA/4.0 (COMPATIBLE; MSIE 5.0; WINDOWS 98; DIGEXT) | FAIR | XXXXXXXXXXXXXXXX |
| 596 | 16-Feb-02 | 17-Feb-02 | PETER@PETER.COM | MOZILLA/4.0 (COMPATIBLE; MSIE 5.0; WINDOWS 98; DIGEXT) | ANNA | XXXXXXXXXXXXXXXX |
| 596 | 16-Feb-02 | 17-Feb-02 | PETER@PETER.COM | MOZILLA/4.0 (COMPATIBLE; MSIE 5.0; WINDOWS 98; DIGEXT) | ANNA | XXXXXXXXXXXXXXXX |
| 596 | 16-Feb-02 | 17-Feb-02 | PETER@PETER.COM | MOZILLA/4.0 (COMPATIBLE; MSIE 5.0; WINDOWS 98; DIGEXT) | ANNA | XXXXXXXXXXXXXXXX |
| 596 | 16-Feb-02 | 17-Feb-02 | PETER@PETER.COM | MOZILLA/4.0 (COMPATIBLE; MSIE 5.0; WINDOWS 98; DIGEXT) | ANNA | XXXXXXXXXXXXXXXX |
| 596 | 16-Feb-02 | 17-Feb-02 | PETER@PETER.COM | MOZILLA/4.0 (COMPATIBLE; MSIE 5.0; WINDOWS 98; DIGEXT) | ANNA | XXXXXXXXXXXXXXXX |
| 595 | 16-Feb-02 | 17-Feb-02 | PETER@PETER.COM | MOZILLA/4.0 (COMPATIBLE; MSIE 5.0; WINDOWS 98; DIGEXT) | ANNA | XXXXXXXXXXXXXXXX |
| 595 | 16-Feb-02 | 17-Feb-02 | PETER@PETER.COM | MOZILLA/4.0 (COMPATIBLE; MSIE 5.0; WINDOWS 98; DIGEXT) | ANNA | XXXXXXXXXXXXXXXX |
| 595 | 16-Feb-02 | 17-Feb-02 | PETER@PETER.COM | MOZILLA/4.0 (COMPATIBLE; MSIE 5.0; WINDOWS 98; DIGEXT) | ANNA | XXXXXXXXXXXXXXXX |
| 595 | 16-Feb-02 | 17-Feb-02 | PETER@PETER.COM | MOZILLA/4.0 (COMPATIBLE; MSIE 5.0; WINDOWS 98; DIGEXT) | ANNA | XXXXXXXXXXXXXXXX |
| 595 | 16-Feb-02 | 17-Feb-02 | PETER@PETER.COM | MOZILLA/4.0 (COMPATIBLE; MSIE 5.0; WINDOWS 98; DIGEXT) | ANNA | XXXXXXXXXXXXXXXX |
| 592 | 17-Feb-02 | 17-Feb-02 | PATRIC@PATRIC.COM | MOZILLA/4.0 (COMPATIBLE; MSIE 5.0; WINDOWS 98; DIGEXT) | SIMON | XXXXXXXXXXXXXXXX |
| 592 | 17-Feb-02 | 17-Feb-02 | PATRIC@PATRIC.COM | MOZILLA/4.0 (COMPATIBLE; MSIE 5.0; WINDOWS 98; DIGEXT) | SIMON | XXXXXXXXXXXXXXXX |
| 592 | 17-Feb-02 | 17-Feb-02 | PATRIC@PATRIC.COM | MOZILLA/4.0 (COMPATIBLE; MSIE 5.0; WINDOWS 98; DIGEXT) | SIMON | XXXXXXXXXXXXXXXX |
| 592 | 17-Feb-02 | 17-Feb-02 | PATRIC@PATRIC.COM | MOZILLA/4.0 (COMPATIBLE; MSIE 5.0; WINDOWS 98; DIGEXT) | SIMON | XXXXXXXXXXXXXXXX |
| 592 | 17-Feb-02 | 17-Feb-02 | PATRIC@PATRIC.COM | MOZILLA/4.0 (COMPATIBLE; MSIE 5.0; WINDOWS 98; DIGEXT) | SIMON | XXXXXXXXXXXXXXXX |
| 592 | 17-Feb-02 | 17-Feb-02 | PATRIC@PATRIC.COM | MOZILLA/4.0 (COMPATIBLE; MSIE 5.0; WINDOWS 98; DIGEXT) | SIMON | XXXXXXXXXXXXXXXX |
| 592 | 17-Feb-02 | 17-Feb-02 | PATRIC@PATRIC.COM | MOZILLA/4.0 (COMPATIBLE; MSIE 5.0; WINDOWS 98; DIGEXT) | SIMON | XXXXXXXXXXXXXXXX |

FIG. 1-G

| TimeDiff | ORDERTIME | CUSTLOCAL TIME | EMAIL | BROWSERID | CARD HOLDER | CARD NUMBER |
|---|---|---|---|---|---|---|
| 592 | 17-Feb-02 | 17-Feb-02 | PATRIC@PATRIC.COM | MOZILLA/4.0 (COMPATIBLE; MSIE 5.0; WINDOWS 98; DIGEXT) | SIMON | XXXXXXXXXXXXXXXX |
| 592 | 17-Feb-02 | 17-Feb-02 | PATRIC@PATRIC.COM | MOZILLA/4.0 (COMPATIBLE; MSIE 5.0; WINDOWS 98; DIGEXT) | SIMON | XXXXXXXXXXXXXXXX |
| 592 | 17-Feb-02 | 17-Feb-02 | PATRIC@PATRIC.COM | MOZILLA/4.0 (COMPATIBLE; MSIE 5.0; WINDOWS 98; DIGEXT) | SIMON | XXXXXXXXXXXXXXXX |
| 592 | 17-Feb-02 | 17-Feb-02 | PATRIC@PATRIC.COM | MOZILLA/4.0 (COMPATIBLE; MSIE 5.0; WINDOWS 98; DIGEXT) | SIMON | XXXXXXXXXXXXXXXX |
| 592 | 17-Feb-02 | 17-Feb-02 | PATRIC@PATRIC.COM | MOZILLA/4.0 (COMPATIBLE; MSIE 5.0; WINDOWS 98; DIGEXT) | SIMON | XXXXXXXXXXXXXXXX |
| 593 | 17-Feb-02 | 17-Feb-02 | PATRIC@PATRIC.COM | MOZILLA/4.0 (COMPATIBLE; MSIE 5.0; WINDOWS 98; DIGEXT) | SIMON | XXXXXXXXXXXXXXXX |
| 593 | 17-Feb-02 | 17-Feb-02 | PATRIC@PATRIC.COM | MOZILLA/4.0 (COMPATIBLE; MSIE 5.0; WINDOWS 98; DIGEXT) | SIMON | XXXXXXXXXXXXXXXX |
| 593 | 17-Feb-02 | 17-Feb-02 | PATRIC@PATRIC.COM | MOZILLA/4.0 (COMPATIBLE; MSIE 5.0; WINDOWS 98; DIGEXT) | SIMON | XXXXXXXXXXXXXXXX |
| 593 | 17-Feb-02 | 17-Feb-02 | PATRIC@PATRIC.COM | MOZILLA/4.0 (COMPATIBLE; MSIE 5.0; WINDOWS 98; DIGEXT) | SIMON | XXXXXXXXXXXXXXXX |
| 593 | 17-Feb-02 | 17-Feb-02 | PATRIC@PATRIC.COM | MOZILLA/4.0 (COMPATIBLE; MSIE 5.0; WINDOWS 98; DIGEXT) | SIMON | XXXXXXXXXXXXXXXX |
| 593 | 17-Feb-02 | 17-Feb-02 | PATRIC@PATRIC.COM | MOZILLA/4.0 (COMPATIBLE; MSIE 5.0; WINDOWS 98; DIGEXT) | SIMON | XXXXXXXXXXXXXXXX |
| 593 | 17-Feb-02 | 17-Feb-02 | PATRIC@PATRIC.COM | MOZILLA/4.0 (COMPATIBLE; MSIE 5.0; WINDOWS 98; DIGEXT) | SIMON | XXXXXXXXXXXXXXXX |
| 593 | 17-Feb-02 | 17-Feb-02 | PATRIC@PATRIC.COM | MOZILLA/4.0 (COMPATIBLE; MSIE 5.0; WINDOWS 98; DIGEXT) | SIMON | XXXXXXXXXXXXXXXX |
| 593 | 17-Feb-02 | 17-Feb-02 | PATRIC@PATRIC.COM | MOZILLA/4.0 (COMPATIBLE; MSIE 5.0; WINDOWS 98; DIGEXT) | SIMON | XXXXXXXXXXXXXXXX |
| 593 | 17-Feb-02 | 17-Feb-02 | PATRIC@PATRIC.COM | MOZILLA/4.0 (COMPATIBLE; MSIE 5.0; WINDOWS 98; DIGEXT) | SIMON | XXXXXXXXXXXXXXXX |
| 592 | 17-Feb-02 | 17-Feb-02 | PATRIC@PATRIC.COM | MOZILLA/4.0 (COMPATIBLE; MSIE 5.0; WINDOWS 98; DIGEXT) | SIMON | XXXXXXXXXXXXXXXX |
| 593 | 17-Feb-02 | 17-Feb-02 | PATRIC@PATRIC.COM | MOZILLA/4.0 (COMPATIBLE; MSIE 5.0; WINDOWS 98; DIGEXT) | SIMON | XXXXXXXXXXXXXXXX |
| 593 | 17-Feb-02 | 17-Feb-02 | PATRIC@PATRIC.COM | MOZILLA/4.0 (COMPATIBLE; MSIE 5.0; WINDOWS 98; DIGEXT) | SIMON | XXXXXXXXXXXXXXXX |
| 593 | 17-Feb-02 | 17-Feb-02 | PATRIC@PATRIC.COM | MOZILLA/4.0 (COMPATIBLE; MSIE 5.0; WINDOWS 98; DIGEXT) | SIMON | XXXXXXXXXXXXXXXX |
| 593 | 17-Feb-02 | 17-Feb-02 | PATRIC@PATRIC.COM | MOZILLA/4.0 (COMPATIBLE; MSIE 5.0; WINDOWS 98; DIGEXT) | WALLACE | XXXXXXXXXXXXXXXX |
| 593 | 17-Feb-02 | 17-Feb-02 | PATRIC@PATRIC.COM | MOZILLA/4.0 (COMPATIBLE; MSIE 5.0; WINDOWS 98; DIGEXT) | SIMON | XXXXXXXXXXXXXXXX |
| 593 | 17-Feb-02 | 17-Feb-02 | PATRIC@PATRIC.COM | MOZILLA/4.0 (COMPATIBLE; MSIE 5.0; WINDOWS 98; DIGEXT) | SIMON | XXXXXXXXXXXXXXXX |
| 592 | 17-Feb-02 | 17-Feb-02 | PATRIC@PATRIC.COM | MOZILLA/4.0 (COMPATIBLE; MSIE 5.0; WINDOWS 98; DIGEXT) | SIMON | XXXXXXXXXXXXXXXX |
| 593 | 17-Feb-02 | 17-Feb-02 | PATRIC@PATRIC.COM | MOZILLA/4.0 (COMPATIBLE; MSIE 5.0; WINDOWS 98; DIGEXT) | SIMON | XXXXXXXXXXXXXXXX |
| 592 | 17-Feb-02 | 17-Feb-02 | PATRIC@PATRIC.COM | MOZILLA/4.0 (COMPATIBLE; MSIE 5.0; WINDOWS 98; DIGEXT) | SIMON | XXXXXXXXXXXXXXXX |
| 593 | 17-Feb-02 | 17-Feb-02 | PATRIC@PATRIC.COM | MOZILLA/4.0 (COMPATIBLE; MSIE 5.0; WINDOWS 98; DIGEXT) | SIMON | XXXXXXXXXXXXXXXX |
| 593 | 17-Feb-02 | 17-Feb-02 | PATRIC@PATRIC.COM | MOZILLA/4.0 (COMPATIBLE; MSIE 5.0; WINDOWS 98; DIGEXT) | SIMON | XXXXXXXXXXXXXXXX |
| 593 | 17-Feb-02 | 17-Feb-02 | PATRIC@PATRIC.COM | MOZILLA/4.0 (COMPATIBLE; MSIE 5.0; WINDOWS 98; DIGEXT) | SIMON | XXXXXXXXXXXXXXXX |
| 593 | 17-Feb-02 | 17-Feb-02 | PATRIC@PATRIC.COM | MOZILLA/4.0 (COMPATIBLE; MSIE 5.0; WINDOWS 98; DIGEXT) | SIMON | XXXXXXXXXXXXXXXX |
| 593 | 17-Feb-02 | 17-Feb-02 | PATRIC@PATRIC.COM | MOZILLA/4.0 (COMPATIBLE; MSIE 5.0; WINDOWS 98; DIGEXT) | SIMON | XXXXXXXXXXXXXXXX |
| 593 | 17-Feb-02 | 17-Feb-02 | PATRIC@PATRIC.COM | MOZILLA/4.0 (COMPATIBLE; MSIE 5.0; WINDOWS 98; DIGEXT) | SIMON | XXXXXXXXXXXXXXXX |
| 593 | 17-Feb-02 | 17-Feb-02 | PATRIC@PATRIC.COM | MOZILLA/4.0 (COMPATIBLE; MSIE 5.0; WINDOWS 98; DIGEXT) | SIMON | XXXXXXXXXXXXXXXX |
| 593 | 17-Feb-02 | 17-Feb-02 | PATRIC@PATRIC.COM | MOZILLA/4.0 (COMPATIBLE; MSIE 5.0; WINDOWS 98; DIGEXT) | SIMON | XXXXXXXXXXXXXXXX |
| 593 | 17-Feb-02 | 17-Feb-02 | PATRIC@PATRIC.COM | MOZILLA/4.0 (COMPATIBLE; MSIE 5.0; WINDOWS 98; DIGEXT) | SIMON | XXXXXXXXXXXXXXXX |
| 593 | 17-Feb-02 | 17-Feb-02 | PATRIC@PATRIC.COM | MOZILLA/4.0 (COMPATIBLE; MSIE 5.0; WINDOWS 98; DIGEXT) | SIMON | XXXXXXXXXXXXXXXX |
| 593 | 17-Feb-02 | 17-Feb-02 | PATRIC@PATRIC.COM | MOZILLA/4.0 (COMPATIBLE; MSIE 5.0; WINDOWS 98; DIGEXT) | SIMON | XXXXXXXXXXXXXXXX |
| 593 | 17-Feb-02 | 17-Feb-02 | PATRIC@PATRIC.COM | MOZILLA/4.0 (COMPATIBLE; MSIE 5.0; WINDOWS 98; DIGEXT) | SIMON | XXXXXXXXXXXXXXXX |
| 593 | 17-Feb-02 | 17-Feb-02 | PATRIC@PATRIC.COM | MOZILLA/4.0 (COMPATIBLE; MSIE 5.0; WINDOWS 98; DIGEXT) | SIMON | XXXXXXXXXXXXXXXX |
| 593 | 17-Feb-02 | 17-Feb-02 | PATRIC@PATRIC.COM | MOZILLA/4.0 (COMPATIBLE; MSIE 5.0; WINDOWS 98; DIGEXT) | SIMON | XXXXXXXXXXXXXXXX |
| 593 | 17-Feb-02 | 17-Feb-02 | PATRIC@PATRIC.COM | MOZILLA/4.0 (COMPATIBLE; MSIE 5.0; WINDOWS 98; DIGEXT) | SIMON | XXXXXXXXXXXXXXXX |
| 593 | 17-Feb-02 | 17-Feb-02 | PATRIC@PATRIC.COM | MOZILLA/4.0 (COMPATIBLE; MSIE 5.0; WINDOWS 98; DIGEXT) | SIMON | XXXXXXXXXXXXXXXX |
| 593 | 17-Feb-02 | 17-Feb-02 | PATRIC@PATRIC.COM | MOZILLA/4.0 (COMPATIBLE; MSIE 5.0; WINDOWS 98; DIGEXT) | SIMON | XXXXXXXXXXXXXXXX |
| 593 | 17-Feb-02 | 17-Feb-02 | PATRIC@PATRIC.COM | MOZILLA/4.0 (COMPATIBLE; MSIE 5.0; WINDOWS 98; DIGEXT) | SIMON | XXXXXXXXXXXXXXXX |
| 593 | 17-Feb-02 | 17-Feb-02 | PATRIC@PATRIC.COM | MOZILLA/4.0 (COMPATIBLE; MSIE 5.0; WINDOWS 98; DIGEXT) | SIMON | XXXXXXXXXXXXXXXX |
| 593 | 17-Feb-02 | 17-Feb-02 | PATRIC@PATRIC.COM | MOZILLA/4.0 (COMPATIBLE; MSIE 5.0; WINDOWS 98; DIGEXT) | SIMON | XXXXXXXXXXXXXXXX |
| 593 | 17-Feb-02 | 17-Feb-02 | PATRIC@PATRIC.COM | MOZILLA/4.0 (COMPATIBLE; MSIE 5.0; WINDOWS 98; DIGEXT) | SIMON | XXXXXXXXXXXXXXXX |
| 593 | 17-Feb-02 | 17-Feb-02 | PATRIC@PATRIC.COM | MOZILLA/4.0 (COMPATIBLE; MSIE 5.0; WINDOWS 98; DIGEXT) | SIMON | XXXXXXXXXXXXXXXX |
| 593 | 17-Feb-02 | 17-Feb-02 | PATRIC@PATRIC.COM | MOZILLA/4.0 (COMPATIBLE; MSIE 5.0; WINDOWS 98; DIGEXT) | SIMON | XXXXXXXXXXXXXXXX |
| 593 | 17-Feb-02 | 17-Feb-02 | PATRIC@PATRIC.COM | MOZILLA/4.0 (COMPATIBLE; MSIE 5.0; WINDOWS 98; DIGEXT) | SIMON | XXXXXXXXXXXXXXXX |
| 593 | 17-Feb-02 | 17-Feb-02 | PATRIC@PATRIC.COM | MOZILLA/4.0 (COMPATIBLE; MSIE 5.0; WINDOWS 98; DIGEXT) | SIMON | XXXXXXXXXXXXXXXX |
| 592 | 17-Feb-02 | 17-Feb-02 | PATRIC@PATRIC.COM | MOZILLA/4.0 (COMPATIBLE; MSIE 5.0; WINDOWS 98; DIGEXT) | SIMON | XXXXXXXXXXXXXXXX |
| 592 | 17-Feb-02 | 17-Feb-02 | PATRIC@PATRIC.COM | MOZILLA/4.0 (COMPATIBLE; MSIE 5.0; WINDOWS 98; DIGEXT) | SIMON | XXXXXXXXXXXXXXXX |

FIG. 1-H

| TimeDiff | ORDERTIME | CUSTLOCAL TIME | EMAIL | BROWSERID | CARD HOLDER | CARD NUMBER |
|---|---|---|---|---|---|---|
| 592 | 17-Feb-02 | 17-Feb-02 | PATRIC@PATRIC.COM | MOZILLA/4.0 (COMPATIBLE; MSIE 5.0; WINDOWS 98; DIGEXT) | SIMON | XXXXXXXXXXXXXXXX |
| 592 | 17-Feb-02 | 17-Feb-02 | PATRIC@PATRIC.COM | MOZILLA/4.0 (COMPATIBLE; MSIE 5.0; WINDOWS 98; DIGEXT) | SIMON | XXXXXXXXXXXXXXXX |
| 592 | 17-Feb-02 | 17-Feb-02 | PATRIC@PATRIC.COM | MOZILLA/4.0 (COMPATIBLE; MSIE 5.0; WINDOWS 98; DIGEXT) | SIMON | XXXXXXXXXXXXXXXX |
| 592 | 17-Feb-02 | 17-Feb-02 | PATRIC@PATRIC.COM | MOZILLA/4.0 (COMPATIBLE; MSIE 5.0; WINDOWS 98; DIGEXT) | SIMON | XXXXXXXXXXXXXXXX |
| 592 | 17-Feb-02 | 17-Feb-02 | PATRIC@PATRIC.COM | MOZILLA/4.0 (COMPATIBLE; MSIE 5.0; WINDOWS 98; DIGEXT) | SIMON | XXXXXXXXXXXXXXXX |
| 592 | 17-Feb-02 | 17-Feb-02 | PATRIC@PATRIC.COM | MOZILLA/4.0 (COMPATIBLE; MSIE 5.0; WINDOWS 98; DIGEXT) | SIMON | XXXXXXXXXXXXXXXX |
| 592 | 17-Feb-02 | 17-Feb-02 | PATRIC@PATRIC.COM | MOZILLA/4.0 (COMPATIBLE; MSIE 5.0; WINDOWS 98; DIGEXT) | SIMON | XXXXXXXXXXXXXXXX |
| 592 | 17-Feb-02 | 17-Feb-02 | PATRIC@PATRIC.COM | MOZILLA/4.0 (COMPATIBLE; MSIE 5.0; WINDOWS 98; DIGEXT) | SIMON | XXXXXXXXXXXXXXXX |
| 592 | 17-Feb-02 | 17-Feb-02 | PATRIC@PATRIC.COM | MOZILLA/4.0 (COMPATIBLE; MSIE 5.0; WINDOWS 98; DIGEXT) | SIMON | XXXXXXXXXXXXXXXX |
| 592 | 17-Feb-02 | 17-Feb-02 | PATRIC@PATRIC.COM | MOZILLA/4.0 (COMPATIBLE; MSIE 5.0; WINDOWS 98; DIGEXT) | SIMON | XXXXXXXXXXXXXXXX |
| 592 | 17-Feb-02 | 17-Feb-02 | PATRIC@PATRIC.COM | MOZILLA/4.0 (COMPATIBLE; MSIE 5.0; WINDOWS 98; DIGEXT) | SIMON | XXXXXXXXXXXXXXXX |
| 592 | 17-Feb-02 | 17-Feb-02 | PATRIC@PATRIC.COM | MOZILLA/4.0 (COMPATIBLE; MSIE 5.0; WINDOWS 98; DIGEXT) | SIMON | XXXXXXXXXXXXXXXX |
| 592 | 17-Feb-02 | 17-Feb-02 | PATRIC@PATRIC.COM | MOZILLA/4.0 (COMPATIBLE; MSIE 5.0; WINDOWS 98; DIGEXT) | SIMON | XXXXXXXXXXXXXXXX |
| 592 | 17-Feb-02 | 17-Feb-02 | PATRIC@PATRIC.COM | MOZILLA/4.0 (COMPATIBLE; MSIE 5.0; WINDOWS 98; DIGEXT) | SIMON | XXXXXXXXXXXXXXXX |
| 592 | 17-Feb-02 | 17-Feb-02 | PATRIC@PATRIC.COM | MOZILLA/4.0 (COMPATIBLE; MSIE 5.0; WINDOWS 98; DIGEXT) | SIMON | XXXXXXXXXXXXXXXX |
| 592 | 17-Feb-02 | 17-Feb-02 | PATRIC@PATRIC.COM | MOZILLA/4.0 (COMPATIBLE; MSIE 5.0; WINDOWS 98; DIGEXT) | SIMON | XXXXXXXXXXXXXXXX |
| 592 | 17-Feb-02 | 17-Feb-02 | PATRIC@PATRIC.COM | MOZILLA/4.0 (COMPATIBLE; MSIE 5.0; WINDOWS 98; DIGEXT) | SIMON | XXXXXXXXXXXXXXXX |
| 592 | 17-Feb-02 | 17-Feb-02 | PATRIC@PATRIC.COM | MOZILLA/4.0 (COMPATIBLE; MSIE 5.0; WINDOWS 98; DIGEXT) | SIMON | XXXXXXXXXXXXXXXX |
| 592 | 17-Feb-02 | 17-Feb-02 | PATRIC@PATRIC.COM | MOZILLA/4.0 (COMPATIBLE; MSIE 5.0; WINDOWS 98; DIGEXT) | SIMON | XXXXXXXXXXXXXXXX |
| 592 | 17-Feb-02 | 17-Feb-02 | PATRIC@PATRIC.COM | MOZILLA/4.0 (COMPATIBLE; MSIE 5.0; WINDOWS 98; DIGEXT) | SIMON | XXXXXXXXXXXXXXXX |
| 593 | 17-Feb-02 | 17-Feb-02 | PATRIC@PATRIC.COM | MOZILLA/4.0 (COMPATIBLE; MSIE 5.0; WINDOWS 98; DIGEXT) | SIMON | XXXXXXXXXXXXXXXX |
| 593 | 17-Feb-02 | 17-Feb-02 | PATRIC@PATRIC.COM | MOZILLA/4.0 (COMPATIBLE; MSIE 5.0; WINDOWS 98; DIGEXT) | SIMON | XXXXXXXXXXXXXXXX |
| 593 | 17-Feb-02 | 17-Feb-02 | PATRIC@PATRIC.COM | MOZILLA/4.0 (COMPATIBLE; MSIE 5.0; WINDOWS 98; DIGEXT) | SIMON | XXXXXXXXXXXXXXXX |
| 593 | 17-Feb-02 | 17-Feb-02 | PATRIC@PATRIC.COM | MOZILLA/4.0 (COMPATIBLE; MSIE 5.0; WINDOWS 98; DIGEXT) | SIMON | XXXXXXXXXXXXXXXX |
| 593 | 17-Feb-02 | 17-Feb-02 | PATRIC@PATRIC.COM | MOZILLA/4.0 (COMPATIBLE; MSIE 5.0; WINDOWS 98; DIGEXT) | SIMON | XXXXXXXXXXXXXXXX |
| 593 | 17-Feb-02 | 17-Feb-02 | PATRIC@PATRIC.COM | MOZILLA/4.0 (COMPATIBLE; MSIE 5.0; WINDOWS 98; DIGEXT) | SIMON | XXXXXXXXXXXXXXXX |
| 593 | 17-Feb-02 | 17-Feb-02 | PATRIC@PATRIC.COM | MOZILLA/4.0 (COMPATIBLE; MSIE 5.0; WINDOWS 98; DIGEXT) | SIMON | XXXXXXXXXXXXXXXX |
| 593 | 17-Feb-02 | 17-Feb-02 | PATRIC@PATRIC.COM | MOZILLA/4.0 (COMPATIBLE; MSIE 5.0; WINDOWS 98; DIGEXT) | SIMON | XXXXXXXXXXXXXXXX |
| 593 | 17-Feb-02 | 17-Feb-02 | PATRIC@PATRIC.COM | MOZILLA/4.0 (COMPATIBLE; MSIE 5.0; WINDOWS 98; DIGEXT) | SIMON | XXXXXXXXXXXXXXXX |
| 593 | 17-Feb-02 | 17-Feb-02 | PATRIC@PATRIC.COM | MOZILLA/4.0 (COMPATIBLE; MSIE 5.0; WINDOWS 98; DIGEXT) | SIMON | XXXXXXXXXXXXXXXX |
| 593 | 17-Feb-02 | 17-Feb-02 | PATRIC@PATRIC.COM | MOZILLA/4.0 (COMPATIBLE; MSIE 5.0; WINDOWS 98; DIGEXT) | SIMON | XXXXXXXXXXXXXXXX |
| 593 | 17-Feb-02 | 17-Feb-02 | PATRIC@PATRIC.COM | MOZILLA/4.0 (COMPATIBLE; MSIE 5.0; WINDOWS 98; DIGEXT) | SIMON | XXXXXXXXXXXXXXXX |
| 593 | 17-Feb-02 | 17-Feb-02 | PATRIC@PATRIC.COM | MOZILLA/4.0 (COMPATIBLE; MSIE 5.0; WINDOWS 98; DIGEXT) | SIMON | XXXXXXXXXXXXXXXX |
| 593 | 17-Feb-02 | 17-Feb-02 | PATRIC@PATRIC.COM | MOZILLA/4.0 (COMPATIBLE; MSIE 5.0; WINDOWS 98; DIGEXT) | SIMON | XXXXXXXXXXXXXXXX |
| 593 | 17-Feb-02 | 17-Feb-02 | PATRIC@PATRIC.COM | MOZILLA/4.0 (COMPATIBLE; MSIE 5.0; WINDOWS 98; DIGEXT) | SIMON | XXXXXXXXXXXXXXXX |
| 593 | 17-Feb-02 | 17-Feb-02 | PATRIC@PATRIC.COM | MOZILLA/4.0 (COMPATIBLE; MSIE 5.0; WINDOWS 98; DIGEXT) | SIMON | XXXXXXXXXXXXXXXX |
| 593 | 17-Feb-02 | 17-Feb-02 | PATRIC@PATRIC.COM | MOZILLA/4.0 (COMPATIBLE; MSIE 5.0; WINDOWS 98; DIGEXT) | SIMON | XXXXXXXXXXXXXXXX |
| 592 | 17-Feb-02 | 17-Feb-02 | PATRIC@PATRIC.COM | MOZILLA/4.0 (COMPATIBLE; MSIE 5.0; WINDOWS 98; DIGEXT) | WALLACE | XXXXXXXXXXXXXXXX |
| 592 | 17-Feb-02 | 17-Feb-02 | PATRIC@PATRIC.COM | MOZILLA/4.0 (COMPATIBLE; MSIE 5.0; WINDOWS 98; DIGEXT) | WALLACE | XXXXXXXXXXXXXXXX |
| 592 | 17-Feb-02 | 17-Feb-02 | PATRIC@PATRIC.COM | MOZILLA/4.0 (COMPATIBLE; MSIE 5.0; WINDOWS 98; DIGEXT) | WALLACE | XXXXXXXXXXXXXXXX |
| 592 | 17-Feb-02 | 17-Feb-02 | PATRIC@PATRIC.COM | MOZILLA/4.0 (COMPATIBLE; MSIE 5.0; WINDOWS 98; DIGEXT) | WALLACE | XXXXXXXXXXXXXXXX |
| 592 | 17-Feb-02 | 17-Feb-02 | PATRIC@PATRIC.COM | MOZILLA/4.0 (COMPATIBLE; MSIE 5.0; WINDOWS 98; DIGEXT) | WALLACE | XXXXXXXXXXXXXXXX |
| 592 | 17-Feb-02 | 17-Feb-02 | PATRIC@PATRIC.COM | MOZILLA/4.0 (COMPATIBLE; MSIE 5.0; WINDOWS 98; DIGEXT) | WALLACE | XXXXXXXXXXXXXXXX |
| 592 | 17-Feb-02 | 17-Feb-02 | PATRIC@PATRIC.COM | MOZILLA/4.0 (COMPATIBLE; MSIE 5.0; WINDOWS 98; DIGEXT) | WALLACE | XXXXXXXXXXXXXXXX |
| 592 | 17-Feb-02 | 17-Feb-02 | PATRIC@PATRIC.COM | MOZILLA/4.0 (COMPATIBLE; MSIE 5.0; WINDOWS 98; DIGEXT) | WALLACE | XXXXXXXXXXXXXXXX |

FIG. 1-I

| TimeDiff | ORDERTIME | CUSTLOCAL TIME | EMAIL | BROWSERID | CARD HOLDER | CARD NUMBER |
|---|---|---|---|---|---|---|
| 592 | 17-Feb-02 | 17-Feb-02 | PATRIC@PATRIC.COM | MOZILLA/4.0 (COMPATIBLE; MSIE 5.0; WINDOWS 98; DIGEXT) | WALLACE | XXXXXXXXXXXXXXXX |
| 592 | 17-Feb-02 | 17-Feb-02 | PATRIC@PATRIC.COM | MOZILLA/4.0 (COMPATIBLE; MSIE 5.0; WINDOWS 98; DIGEXT) | WALLACE | XXXXXXXXXXXXXXXX |
| 592 | 17-Feb-02 | 17-Feb-02 | PATRIC@PATRIC.COM | MOZILLA/4.0 (COMPATIBLE; MSIE 5.0; WINDOWS 98; DIGEXT) | WALLACE | XXXXXXXXXXXXXXXX |
| 592 | 17-Feb-02 | 17-Feb-02 | PATRIC@PATRIC.COM | MOZILLA/4.0 (COMPATIBLE; MSIE 5.0; WINDOWS 98; DIGEXT) | WALLACE | XXXXXXXXXXXXXXXX |
| 592 | 17-Feb-02 | 17-Feb-02 | PATRIC@PATRIC.COM | MOZILLA/4.0 (COMPATIBLE; MSIE 5.0; WINDOWS 98; DIGEXT) | WALLACE | XXXXXXXXXXXXXXXX |
| 592 | 17-Feb-02 | 17-Feb-02 | PATRIC@PATRIC.COM | MOZILLA/4.0 (COMPATIBLE; MSIE 5.0; WINDOWS 98; DIGEXT) | WALLACE | XXXXXXXXXXXXXXXX |
| 592 | 17-Feb-02 | 17-Feb-02 | PATRIC@PATRIC.COM | MOZILLA/4.0 (COMPATIBLE; MSIE 5.0; WINDOWS 98; DIGEXT) | WALLACE | XXXXXXXXXXXXXXXX |
| 592 | 17-Feb-02 | 17-Feb-02 | PATRIC@PATRIC.COM | MOZILLA/4.0 (COMPATIBLE; MSIE 5.0; WINDOWS 98; DIGEXT) | WALLACE | XXXXXXXXXXXXXXXX |
| 592 | 17-Feb-02 | 17-Feb-02 | PATRIC@PATRIC.COM | MOZILLA/4.0 (COMPATIBLE; MSIE 5.0; WINDOWS 98; DIGEXT) | WALLACE | XXXXXXXXXXXXXXXX |
| 592 | 17-Feb-02 | 17-Feb-02 | PATRIC@PATRIC.COM | MOZILLA/4.0 (COMPATIBLE; MSIE 5.0; WINDOWS 98; DIGEXT) | WALLACE | XXXXXXXXXXXXXXXX |
| 592 | 17-Feb-02 | 17-Feb-02 | PATRIC@PATRIC.COM | MOZILLA/4.0 (COMPATIBLE; MSIE 5.0; WINDOWS 98; DIGEXT) | WALLACE | XXXXXXXXXXXXXXXX |
| 592 | 17-Feb-02 | 17-Feb-02 | PATRIC@PATRIC.COM | MOZILLA/4.0 (COMPATIBLE; MSIE 5.0; WINDOWS 98; DIGEXT) | WALLACE | XXXXXXXXXXXXXXXX |
| 592 | 17-Feb-02 | 17-Feb-02 | PATRIC@PATRIC.COM | MOZILLA/4.0 (COMPATIBLE; MSIE 5.0; WINDOWS 98; DIGEXT) | WALLACE | XXXXXXXXXXXXXXXX |
| 592 | 17-Feb-02 | 17-Feb-02 | PATRIC@PATRIC.COM | MOZILLA/4.0 (COMPATIBLE; MSIE 5.0; WINDOWS 98; DIGEXT) | WALLACE | XXXXXXXXXXXXXXXX |
| 598 | 17-Feb-02 | 18-Feb-02 | YEHIA@YEHIA.COM | MOZILLA/4.0 (COMPATIBLE; MSIE 5.0; WINDOWS 98; DIGEXT) | GOUDA | XXXXXXXXXXXXXXXX |
| 598 | 17-Feb-02 | 18-Feb-02 | YEHIA@YEHIA.COM | MOZILLA/4.0 (COMPATIBLE; MSIE 5.0; WINDOWS 98; DIGEXT) | GOUDA | XXXXXXXXXXXXXXXX |
| 596 | 16-Feb-02 | 17-Feb-02 | PETER@PETER.COM | MOZILLA/4.0 (COMPATIBLE; MSIE 5.0; WINDOWS 98; DIGEXT) | ANNA | XXXXXXXXXXXXXXXX |
| 596 | 16-Feb-02 | 17-Feb-02 | PETER@PETER.COM | MOZILLA/4.0 (COMPATIBLE; MSIE 5.0; WINDOWS 98; DIGEXT) | ANNA | XXXXXXXXXXXXXXXX |
| 596 | 16-Feb-02 | 17-Feb-02 | PETER@PETER.COM | MOZILLA/4.0 (COMPATIBLE; MSIE 5.0; WINDOWS 98; DIGEXT) | ANNA | XXXXXXXXXXXXXXXX |
| 596 | 16-Feb-02 | 17-Feb-02 | PETER@PETER.COM | MOZILLA/4.0 (COMPATIBLE; MSIE 5.0; WINDOWS 98; DIGEXT) | ANNA | XXXXXXXXXXXXXXXX |
| 596 | 16-Feb-02 | 17-Feb-02 | PETER@PETER.COM | MOZILLA/4.0 (COMPATIBLE; MSIE 5.0; WINDOWS 98; DIGEXT) | ANNA | XXXXXXXXXXXXXXXX |
| 596 | 16-Feb-02 | 17-Feb-02 | PETER@PETER.COM | MOZILLA/4.0 (COMPATIBLE; MSIE 5.0; WINDOWS 98; DIGEXT) | ANNA | XXXXXXXXXXXXXXXX |
| 594 | 16-Feb-02 | 17-Feb-02 | PETER@PETER.COM | MOZILLA/4.0 (COMPATIBLE; MSIE 5.0; WINDOWS 98; DIGEXT) | ANNA | XXXXXXXXXXXXXXXX |
| 594 | 16-Feb-02 | 17-Feb-02 | PETER@PETER.COM | MOZILLA/4.0 (COMPATIBLE; MSIE 5.0; WINDOWS 98; DIGEXT) | ANNA | XXXXXXXXXXXXXXXX |
| 594 | 16-Feb-02 | 17-Feb-02 | PETER@PETER.COM | MOZILLA/4.0 (COMPATIBLE; MSIE 5.0; WINDOWS 98; DIGEXT) | ANNA | XXXXXXXXXXXXXXXX |
| 594 | 16-Feb-02 | 17-Feb-02 | PETER@PETER.COM | MOZILLA/4.0 (COMPATIBLE; MSIE 5.0; WINDOWS 98; DIGEXT) | ANNA | XXXXXXXXXXXXXXXX |
| 594 | 16-Feb-02 | 17-Feb-02 | PETER@PETER.COM | MOZILLA/4.0 (COMPATIBLE; MSIE 5.0; WINDOWS 98; DIGEXT) | ANNA | XXXXXXXXXXXXXXXX |
| 594 | 16-Feb-02 | 17-Feb-02 | PETER@PETER.COM | MOZILLA/4.0 (COMPATIBLE; MSIE 5.0; WINDOWS 98; DIGEXT) | ANNA | XXXXXXXXXXXXXXXX |
| 594 | 16-Feb-02 | 17-Feb-02 | PETER@PETER.COM | MOZILLA/4.0 (COMPATIBLE; MSIE 5.0; WINDOWS 98; DIGEXT) | ANNA | XXXXXXXXXXXXXXXX |
| 594 | 16-Feb-02 | 17-Feb-02 | PETER@PETER.COM | MOZILLA/4.0 (COMPATIBLE; MSIE 5.0; WINDOWS 98; DIGEXT) | ANNA | XXXXXXXXXXXXXXXX |
| 594 | 16-Feb-02 | 17-Feb-02 | PETER@PETER.COM | MOZILLA/4.0 (COMPATIBLE; MSIE 5.0; WINDOWS 98; DIGEXT) | ANNA | XXXXXXXXXXXXXXXX |
| 592 | 17-Feb-02 | 17-Feb-02 | PATRIC@PATRIC.COM | MOZILLA/4.0 (COMPATIBLE; MSIE 5.0; WINDOWS 98; DIGEXT) | SIMON | XXXXXXXXXXXXXXXX |
| 592 | 17-Feb-02 | 17-Feb-02 | PATRIC@PATRIC.COM | MOZILLA/4.0 (COMPATIBLE; MSIE 5.0; WINDOWS 98; DIGEXT) | SIMON | XXXXXXXXXXXXXXXX |
| 592 | 17-Feb-02 | 17-Feb-02 | PATRIC@PATRIC.COM | MOZILLA/4.0 (COMPATIBLE; MSIE 5.0; WINDOWS 98; DIGEXT) | SIMON | XXXXXXXXXXXXXXXX |
| 592 | 17-Feb-02 | 17-Feb-02 | PATRIC@PATRIC.COM | MOZILLA/4.0 (COMPATIBLE; MSIE 5.0; WINDOWS 98; DIGEXT) | SIMON | XXXXXXXXXXXXXXXX |
| 592 | 17-Feb-02 | 17-Feb-02 | PATRIC@PATRIC.COM | MOZILLA/4.0 (COMPATIBLE; MSIE 5.0; WINDOWS 98; DIGEXT) | SIMON | XXXXXXXXXXXXXXXX |
| 593 | 17-Feb-02 | 17-Feb-02 | PATRIC@PATRIC.COM | MOZILLA/4.0 (COMPATIBLE; MSIE 5.0; WINDOWS 98; DIGEXT) | SIMON | XXXXXXXXXXXXXXXX |
| 593 | 17-Feb-02 | 17-Feb-02 | PATRIC@PATRIC.COM | MOZILLA/4.0 (COMPATIBLE; MSIE 5.0; WINDOWS 98; DIGEXT) | SIMON | XXXXXXXXXXXXXXXX |
| 593 | 17-Feb-02 | 17-Feb-02 | PATRIC@PATRIC.COM | MOZILLA/4.0 (COMPATIBLE; MSIE 5.0; WINDOWS 98; DIGEXT) | SIMON | XXXXXXXXXXXXXXXX |
| 593 | 17-Feb-02 | 17-Feb-02 | PATRIC@PATRIC.COM | MOZILLA/4.0 (COMPATIBLE; MSIE 5.0; WINDOWS 98; DIGEXT) | SIMON | XXXXXXXXXXXXXXXX |
| 593 | 17-Feb-02 | 17-Feb-02 | PATRIC@PATRIC.COM | MOZILLA/4.0 (COMPATIBLE; MSIE 5.0; WINDOWS 98; DIGEXT) | SIMON | XXXXXXXXXXXXXXXX |
| 593 | 17-Feb-02 | 17-Feb-02 | PATRIC@PATRIC.COM | MOZILLA/4.0 (COMPATIBLE; MSIE 5.0; WINDOWS 98; DIGEXT) | SIMON | XXXXXXXXXXXXXXXX |
| 593 | 17-Feb-02 | 17-Feb-02 | PATRIC@PATRIC.COM | MOZILLA/4.0 (COMPATIBLE; MSIE 5.0; WINDOWS 98; DIGEXT) | SIMON | XXXXXXXXXXXXXXXX |
| 592 | 17-Feb-02 | 17-Feb-02 | PATRIC@PATRIC.COM | MOZILLA/4.0 (COMPATIBLE; MSIE 5.0; WINDOWS 98; DIGEXT) | SIMON | XXXXXXXXXXXXXXXX |
| 592 | 17-Feb-02 | 17-Feb-02 | PATRIC@PATRIC.COM | MOZILLA/4.0 (COMPATIBLE; MSIE 5.0; WINDOWS 98; DIGEXT) | SIMON | XXXXXXXXXXXXXXXX |

FIG. 1-J

| TimeDiff | ORDERTIME | CUSTLOCAL TIME | EMAIL | BROWSERID | CARD HOLDER | CARD NUMBER |
|---|---|---|---|---|---|---|
| 592 | 17-Feb-02 | 17-Feb-02 | PATRIC@PATRIC.COM | MOZILLA/4.0 (COMPATIBLE; MSIE 5.0; WINDOWS 98; DIGEXT) | SIMON | XXXXXXXXXXXXXXXX |
| 592 | 17-Feb-02 | 17-Feb-02 | PATRIC@PATRIC.COM | MOZILLA/4.0 (COMPATIBLE; MSIE 5.0; WINDOWS 98; DIGEXT) | SIMON | XXXXXXXXXXXXXXXX |
| 592 | 17-Feb-02 | 17-Feb-02 | PATRIC@PATRIC.COM | MOZILLA/4.0 (COMPATIBLE; MSIE 5.0; WINDOWS 98; DIGEXT) | WALLACE | XXXXXXXXXXXXXXXX |
| 592 | 17-Feb-02 | 17-Feb-02 | PATRIC@PATRIC.COM | MOZILLA/4.0 (COMPATIBLE; MSIE 5.0; WINDOWS 98; DIGEXT) | WALLACE | XXXXXXXXXXXXXXXX |
| 592 | 17-Feb-02 | 17-Feb-02 | PATRIC@PATRIC.COM | MOZILLA/4.0 (COMPATIBLE; MSIE 5.0; WINDOWS 98; DIGEXT) | WALLACE | XXXXXXXXXXXXXXXX |
| 592 | 17-Feb-02 | 17-Feb-02 | PATRIC@PATRIC.COM | MOZILLA/4.0 (COMPATIBLE; MSIE 5.0; WINDOWS 98; DIGEXT) | WALLACE | XXXXXXXXXXXXXXXX |
| 592 | 17-Feb-02 | 17-Feb-02 | PATRIC@PATRIC.COM | MOZILLA/4.0 (COMPATIBLE; MSIE 5.0; WINDOWS 98; DIGEXT) | WALLACE | XXXXXXXXXXXXXXXX |
| 592 | 17-Feb-02 | 17-Feb-02 | PATRIC@PATRIC.COM | MOZILLA/4.0 (COMPATIBLE; MSIE 5.0; WINDOWS 98; DIGEXT) | WALLACE | XXXXXXXXXXXXXXXX |
| 592 | 17-Feb-02 | 17-Feb-02 | PATRIC@PATRIC.COM | MOZILLA/4.0 (COMPATIBLE; MSIE 5.0; WINDOWS 98; DIGEXT) | WALLACE | XXXXXXXXXXXXXXXX |
| 595 | 11-Apr-02 | 12-Apr-02 | NEHA@NEHA.COM | MOZILLA/4.0 (COMPATIBLE; MSIE 5.0; WINDOWS 98; DIGEXT) | ORLEANS | XXXXXXXXXXXXXXXX |
| 595 | 11-Apr-02 | 12-Apr-02 | NEHA@NEHA.COM | MOZILLA/4.0 (COMPATIBLE; MSIE 5.0; WINDOWS 98; DIGEXT) | ORLEANS | XXXXXXXXXXXXXXXX |
| 603 | 19-Apr-02 | 19-Apr-02 | L.COM | MOZILLA/4.0 (COMPATIBLE; MSIE 5.0; WINDOWS 98; DIGEXT) | WICHMAN | XXXXXXXXXXXXXXXX |
| 603 | 19-Apr-02 | 19-Apr-02 | L.COM | MOZILLA/4.0 (COMPATIBLE; MSIE 5.0; WINDOWS 98; DIGEXT) | WICHMAN | XXXXXXXXXXXXXXXX |
| 597 | 18-Apr-02 | 19-Apr-02 | AHMED@AHMED.COM | MOZILLA/4.0 (COMPATIBLE; MSIE 5.0; WINDOWS 98; DIGEXT) | HOOVER | XXXXXXXXXXXXXXXX |
| 597 | 18-Apr-02 | 19-Apr-02 | AHMED@AHMED.COM | MOZILLA/4.0 (COMPATIBLE; MSIE 5.0; WINDOWS 98; DIGEXT) | HOOVER | XXXXXXXXXXXXXXXX |
| 597 | 18-Apr-02 | 19-Apr-02 | AHMED@AHMED.COM | MOZILLA/4.0 (COMPATIBLE; MSIE 5.0; WINDOWS 98; DIGEXT) | HOOVER | XXXXXXXXXXXXXXXX |
| 597 | 18-Apr-02 | 19-Apr-02 | AHMED@AHMED.COM | MOZILLA/4.0 (COMPATIBLE; MSIE 5.0; WINDOWS 98; DIGEXT) | HOOVER | XXXXXXXXXXXXXXXX |
| 597 | 18-Apr-02 | 19-Apr-02 | AHMED@AHMED.COM | MOZILLA/4.0 (COMPATIBLE; MSIE 5.0; WINDOWS 98; DIGEXT) | HOOVER | XXXXXXXXXXXXXXXX |
| 597 | 18-Apr-02 | 19-Apr-02 | AHMED@AHMED.COM | MOZILLA/4.0 (COMPATIBLE; MSIE 5.0; WINDOWS 98; DIGEXT) | HOOVER | XXXXXXXXXXXXXXXX |
| 597 | 18-Apr-02 | 19-Apr-02 | AHMED@AHMED.COM | MOZILLA/4.0 (COMPATIBLE; MSIE 5.0; WINDOWS 98; DIGEXT) | HOOVER | XXXXXXXXXXXXXXXX |
| 597 | 18-Apr-02 | 19-Apr-02 | AHMED@AHMED.COM | MOZILLA/4.0 (COMPATIBLE; MSIE 5.0; WINDOWS 98; DIGEXT) | HOOVER | XXXXXXXXXXXXXXXX |
| 600 | 25-Apr-02 | 26-Apr-02 | IATTITUDE@IATTITUDE.COM | MOZILLA/4.0 (COMPATIBLE; MSIE 5.0; WINDOWS 98; DIGEXT) | WHITUS | XXXXXXXXXXXXXXXX |
| 600 | 25-Apr-02 | 26-Apr-02 | IATTITUDE@IATTITUDE.COM | MOZILLA/4.0 (COMPATIBLE; MSIE 5.0; WINDOWS 98; DIGEXT) | WHITUS | XXXXXXXXXXXXXXXX |
| 595 | 08-Apr-02 | 09-Apr-02 | T | MOZILLA/4.0 (COMPATIBLE; MSIE 5.0; WINDOWS 98; DIGEXT) | TOYODA | XXXXXXXXXXXXXXXX |
| 600 | 25-Apr-02 | 26-Apr-02 | IATTITUDE@IATTITUDE.COM | MOZILLA/4.0 (COMPATIBLE; MSIE 5.0; WINDOWS 98; DIGEXT) | WHITUS | XXXXXXXXXXXXXXXX |
| 600 | 25-Apr-02 | 26-Apr-02 | IATTITUDE@IATTITUDE.COM | MOZILLA/4.0 (COMPATIBLE; MSIE 5.0; WINDOWS 98; DIGEXT) | HOOVER | XXXXXXXXXXXXXXXX |
| 597 | 18-Apr-02 | 19-Apr-02 | AHMED@AHMED.COM | MOZILLA/4.0 (COMPATIBLE; MSIE 5.0; WINDOWS 98; DIGEXT) | HOOVER | XXXXXXXXXXXXXXXX |
| 597 | 18-Apr-02 | 19-Apr-02 | AHMED@AHMED.COM | MOZILLA/4.0 (COMPATIBLE; MSIE 5.0; WINDOWS 98; DIGEXT) | HOOVER | XXXXXXXXXXXXXXXX |
| 597 | 18-Apr-02 | 19-Apr-02 | AHMED@AHMED.COM | MOZILLA/4.0 (COMPATIBLE; MSIE 5.0; WINDOWS 98; DIGEXT) | HOOVER | XXXXXXXXXXXXXXXX |
| 597 | 18-Apr-02 | 19-Apr-02 | AHMED@AHMED.COM | MOZILLA/4.0 (COMPATIBLE; MSIE 5.0; WINDOWS 98; DIGEXT) | HOOVER | XXXXXXXXXXXXXXXX |
| 597 | 18-Apr-02 | 19-Apr-02 | AHMED@AHMED.COM | MOZILLA/4.0 (COMPATIBLE; MSIE 5.0; WINDOWS 98; DIGEXT) | HOOVER | XXXXXXXXXXXXXXXX |
| 597 | 07-May-02 | 07-May-02 | BT | MOZILLA/4.0 (COMPATIBLE; MSIE 5.0; WINDOWS 98; DIGEXT) | RINZIN | XXXXXXXXXXXXXXXX |
| 597 | 07-May-02 | 07-May-02 | BT | MOZILLA/4.0 (COMPATIBLE; MSIE 5.0; WINDOWS 98; DIGEXT) | RINZIN | XXXXXXXXXXXXXXXX |
| 597 | 07-May-02 | 07-May-02 | BT | MOZILLA/4.0 (COMPATIBLE; MSIE 5.0; WINDOWS 98; DIGEXT) | RINZIN | XXXXXXXXXXXXXXXX |
| 597 | 07-May-02 | 07-May-02 | BT | MOZILLA/4.0 (COMPATIBLE; MSIE 5.0; WINDOWS 98; DIGEXT) | RINZIN | XXXXXXXXXXXXXXXX |
| 597 | 07-May-02 | 07-May-02 | BT | MOZILLA/4.0 (COMPATIBLE; MSIE 5.0; WINDOWS 98; DIGEXT) | RINZIN | XXXXXXXXXXXXXXXX |
| 597 | 07-May-02 | 07-May-02 | BT | MOZILLA/4.0 (COMPATIBLE; MSIE 5.0; WINDOWS 98; DIGEXT) | RINZIN | XXXXXXXXXXXXXXXX |
| 597 | 07-May-02 | 07-May-02 | BT | MOZILLA/4.0 (COMPATIBLE; MSIE 5.0; WINDOWS 98; DIGEXT) | RINZIN | XXXXXXXXXXXXXXXX |
| 592 | 24-May-02 | 25-May-02 | M | MOZILLA/4.0 (COMPATIBLE; MSIE 5.0; WINDOWS 98; DIGEXT) | AHMED | XXXXXXXXXXXXXXXX |
| 592 | 24-May-02 | 25-May-02 | M | MOZILLA/4.0 (COMPATIBLE; MSIE 5.0; WINDOWS 98; DIGEXT) | AHMED | XXXXXXXXXXXXXXXX |
| 599 | 21-May-02 | 21-May-02 | M | MOZILLA/4.0 (COMPATIBLE; MSIE 5.0; WINDOWS 98; DIGEXT) | TRELOAR | XXXXXXXXXXXXXXXX |
| 600 | 09-Jun-02 | 10-Jun-02 | CUTIE@CUTIE.COM | MOZILLA/4.0 (COMPATIBLE; MSIE 5.0; WINDOWS 98; DIGEXT) | HARRISON | XXXXXXXXXXXXXXXX |
| 600 | 09-Jun-02 | 10-Jun-02 | CUTIE@CUTIE.COM | MOZILLA/4.0 (COMPATIBLE; MSIE 5.0; WINDOWS 98; DIGEXT) | HARRISON | XXXXXXXXXXXXXXXX |
| 600 | 09-Jun-02 | 10-Jun-02 | CUTIE@CUTIE.COM | MOZILLA/4.0 (COMPATIBLE; MSIE 5.0; WINDOWS 98; DIGEXT) | HARRISON | XXXXXXXXXXXXXXXX |

FIG. 1-K

| TimeDiff | ORDERTIME | CUSTLOCAL TIME | EMAIL | BROWSERID | CARD HOLDER | CARD NUMBER |
|---|---|---|---|---|---|---|
| 598 | 29-May-02 | 29-May-02 | COM | MOZILLA/4.0 (COMPATIBLE; MSIE 5.0; WINDOWS 98; DIGEXT) | ALMAS | XXXXXXXXXXXXXXXX |
| 600 | 29-May-02 | 30-May-02 | LINA@LINA.COM | MOZILLA/4.0 (COMPATIBLE; MSIE 5.0; WINDOWS 98; DIGEXT) | ATHANA | XXXXXXXXXXXXXXXX |
| 600 | 29-May-02 | 30-May-02 | LINA@LINA.COM | MOZILLA/4.0 (COMPATIBLE; MSIE 5.0; WINDOWS 98; DIGEXT) | ATHANA | XXXXXXXXXXXXXXXX |
| 600 | 29-May-02 | 30-May-02 | LINA@LINA.COM | MOZILLA/4.0 (COMPATIBLE; MSIE 5.0; WINDOWS 98; DIGEXT) | ATHANA | XXXXXXXXXXXXXXXX |
| 601 | 29-May-02 | 29-May-02 | TMAIL.COM | MOZILLA/4.0 (COMPATIBLE; MSIE 5.0; WINDOWS 98; DIGEXT) | CANNON | XXXXXXXXXXXXXXXX |
| 598 | 28-Jun-02 | 29-Jun-02 | YAKOOB@YAKOOB.COM | MOZILLA/4.0 (COMPATIBLE; MSIE 5.0; WINDOWS 98; DIGEXT) | YAKOOB | XXXXXXXXXXXXXXXX |
| 601 | 14-May-02 | 15-May-02 | M | MOZILLA/4.0 (COMPATIBLE; MSIE 5.0; WINDOWS 98; DIGEXT) | NEWMAN | XXXXXXXXXXXXXXXX |
| 601 | 14-May-02 | 15-May-02 | M | MOZILLA/4.0 (COMPATIBLE; MSIE 5.0; WINDOWS 98; DIGEXT) | NEWMAN | XXXXXXXXXXXXXXXX |
| 601 | 14-May-02 | 15-May-02 | M | MOZILLA/4.0 (COMPATIBLE; MSIE 5.0; WINDOWS 98; DIGEXT) | NEWMAN | XXXXXXXXXXXXXXXX |
| 601 | 14-May-02 | 15-May-Q2 | M | MOZILLA/4.0 (COMPATIBLE; MSIE 5.0; WINDOWS 98; DIGEXT) | NEWMAN | XXXXXXXXXXXXXXXX |
| 601 | 14-May-02 | 15-May-02 | M | MOZILLA/4.0 (COMPATIBLE; MSIE 5.0; WINDOWS 98; DIGEXT) | NEWMAN | XXXXXXXXXXXXXXXX |
| 585 | 14-May-02 | 15-May-02 | M | MOZILLA/4.0 (COMPATIBLE; MSIE 5.0; WINDOWS 98; DIGEXT) | ALI-KHAN | XXXXXXXXXXXXXXXX |
| 601 | 29-May-02 | 29-May-02 | TMAIL.COM | MOZILLA/4.0 (COMPATIBLE; MSIE 5.0; WINDOWS 98; DIGEXT) | CANNON | XXXXXXXXXXXXXXXX |
| 601 | 29-May-02 | 29-May-02 | TMAIL.COM | MOZILLA/4.0 (COMPATIBLE; MSIE 5.0; WINDOWS 98; DIGEXT) | CANNON | XXXXXXXXXXXXXXXX |
| 596 | 12-Jun-02 | 13-Jun-02 | SHORA88@SHORA.COM | MOZILLA/4.0 (COMPATIBLE; MSIE 5.0; WINDOWS 98; DIGEXT) | JOHN | XXXXXXXXXXXXXXXX |
| 596 | 12-Jun-02 | 13-Jun-02 | SHORA88@SHORA.COM | MOZILLA/4.0 (COMPATIBLE; MSIE 5.0; WINDOWS 98; DIGEXT) | JOHN | XXXXXXXXXXXXXXXX |
| 596 | 12-Jun-02 | 13-Jun-02 | SHORA88@SHORA.COM | MOZILLA/4.0 (COMPATIBLE; MSIE 5.0; WINDOWS 98; DIGEXT) | JOHN | XXXXXXXXXXXXXXXX |
| 596 | 12-Jun-02 | 13-Jun-02 | SHORA88@SHORA.COM | MOZILLA/4.0 (COMPATIBLE; MSIE 5.0; WINDOWS 98; DIGEXT) | JOHN | XXXXXXXXXXXXXXXX |
| 600 | 22-Jun-02 | 22-Jun-02 | FAYSEEM@FAYSEEM.COM | MOZILLA/4.0 (COMPATIBLE; MSIE 5.0; WINDOWS 98; DIGEXT) | GARCIA | XXXXXXXXXXXXXXXX |
| 604 | 06-Jun-02 | 06-Jun-02 | .NET | MOZILLA/4.0 (COMPATIBLE; MSIE 5.0; WINDOWS 98; DIGEXT) | SAHOOL | XXXXXXXXXXXXXXXX |
| 597 | 18-Jun-02 | 18-Jun-02 | SANATAZ@SANATAZ.COM | MOZILLA/4.0 (COMPATIBLE; MSIE 5.0; WINDOWS 98; DIGEXT) | TOM | XXXXXXXXXXXXXXXX |
| 597 | 18-Jun-02 | 18-Jun-02 | SANATAZ@SANATAZ.COM | MOZILLA/4.0 (COMPATIBLE; MSIE 5.0; WINDOWS 98; DIGEXT) | TOM | XXXXXXXXXXXXXXXX |
| 597 | 18-Jun-02 | 18-Jun-02 | SANATAZ@SANATAZ.COM | MOZILLA/4.0 (COMPATIBLE; MSIE 5.0; WINDOWS 98; DIGEXT) | TOM | XXXXXXXXXXXXXXXX |
| 597 | 18-Jun-02 | 18-Jun-02 | SANATAZ@SANATAZ.COM | MOZILLA/4.0 (COMPATIBLE; MSIE 5.0; WINDOWS 98; DIGEXT) | TOM | XXXXXXXXXXXXXXXX |

Alphabetical Index of Time Zone Abbreviations

Note: Some listed abbreviations are not unique and have several entries while other time zones have many common names and are listed as well.

| Abbreviation | Full name | Location | Time zone |
| --- | --- | --- | --- |
| A | Alpha Time Zone | Military | UTC + 1 hour |
| ACDT | Australian Central Daylight Time | Australia | UTC + 10:30 hours |
| ACST | Australian Central Standard Time | Australia | UTC + 9:30 hours |
| ADT | Atlantic Daylight Time | North America | UTC - 3 hours |
| AEDT | Australian Eastern Daylight Time | Australia | UTC + 11 hours |
| AEST | Australian Eastern Standard Time | Australia | UTC + 10 hours |
| AKDT | Alaska Daylight Time | North America | UTC - 8 hours |
| AKST | Alaska Standard Time | North America | UTC - 9 hours |
| AST | Atlantic Standard Time | North America | UTC - 4 hours |
| AWST | Australian Western Standard Time | Australia | UTC + 8 hours |
| B | Bravo Time Zone | Military | UTC + 2 hours |
| BST | British Summer Time | Europe | UTC + 1 hour |
| C | Charlie Time Zone | Military | UTC + 3 hours |
| CDT | Central Daylight Time | Australia | UTC + 10:30 hours |
| CDT | Central Daylight Time | North America | UTC - 5 hours |
| CEDT | Central European Daylight Time | Europe | UTC + 2 hours |
| CEST | Central European Summer Time | Europe | UTC + 2 hours |
| CET | Central European Time | Europe | UTC + 1 hour |
| CST | Central Standard Time | Australia | UTC + 9:30 hours |
| CST | Central Standard Time | North America | UTC - 6 hours |
| CXT | Christmas Island Time | Australia | UTC + 7 hours |
| D | Delta Time Zone | Military | UTC + 4 hours |
| E | Echo Time Zone | Military | UTC + 5 hours |
| EDT | Eastern Daylight Time | Australia | UTC + 11 hours |
| EDT | Eastern Daylight Time | North America | UTC - 4 hours |
| EEDT | Eastern European Daylight Time | Europe | UTC + 3 hours |
| EEST | Eastern European Summer Time | Europe | UTC + 3 hours |

FIG. 3-A

| | | | |
|---|---|---|---|
| EET | Eastern European Time | Europe | UTC + 2 hours |
| EST | Eastern Standard Time | Australia | UTC + 10 hours |
| EST | Eastern Standard Time | North America | UTC - 5 hours |
| F | Foxtrot Time Zone | Military | UTC + 6 hours |
| G | Golf Time Zone | Military | UTC + 7 hours |
| GMT | Greenwich Mean Time | Europe | UTC |
| H | Hotel Time Zone | Military | UTC + 8 hours |
| HAA | Heure Avancée de l'Atlantique | North America | UTC - 3 hours |
| HAC | Heure Avancée du Centre | North America | UTC - 5 hours |
| HADT | Hawaii-Aleutian Daylight Time | North America | UTC - 9 hours |
| HAE | Heure Avancée de l'Est | North America | UTC - 4 hours |
| HAP | Heure Avancée du Pacifique | North America | UTC - 7 hours |
| HAR | Heure Avancée des Rocheuses | North America | UTC - 6 hours |
| HAST | Hawaii-Aleutian Standard Time | North America | UTC - 10 hours |
| HAT | Heure Avancée de Terre-Neuve | North America | UTC - 2:30 hours |
| HAY | Heure Avancée du Yukon | North America | UTC - 8 hours |
| HNA | Heure Normale de l'Atlantique | North America | UTC - 4 hours |
| HNC | Heure Normale du Centre | North America | UTC - 6 hours |
| HNE | Heure Normale de l'Est | North America | UTC - 5 hours |
| HNP | Heure Normale du Pacifique | North America | UTC - 8 hours |
| HNR | Heure Normale des Rocheuses | North America | UTC - 7 hours |
| HNT | Heure Normale de Terre-Neuve | North America | UTC - 3:30 hours |
| HNY | Heure Normale du Yukon | North America | UTC - 9 hours |
| I | India Time Zone | Military | UTC + 9 hours |
| IST | Irish Summer Time | Europe | UTC + 1 hour |
| K | Kilo Time Zone | Military | UTC + 10 hours |
| L | Lima Time Zone | Military | UTC + 11 hours |
| M | Mike Time Zone | Military | UTC + 12 hours |
| MDT | Mountain Daylight Time | North America | UTC - 6 hours |
| MESZ | Mitteleuropäische Sommerzeit | Europe | UTC + 2 hours |
| MEZ | Mitteleuropäische Zeit | Europe | UTC + 1 hour |
| MST | Mountain Standard Time | North America | UTC - 7 hours |

FIG. 3-B

| | | | |
|---|---|---|---|
| N | November Time Zone | Military | UTC - 1 hour |
| NDT | Newfoundland Daylight Time | North America | UTC - 2:30 hours |
| NFT | Norfolk (Island) Time | Australia | UTC + 11:30 hours |
| NST | Newfoundland Standard Time | North America | UTC - 3:30 hours |
| O | Oscar Time Zone | Military | UTC - 2 hours |
| P | Papa Time Zone | Military | UTC - 3 hours |
| PDT | Pacific Daylight Time | North America | UTC - 7 hours |
| PST | Pacific Standard Time | North America | UTC - 8 hours |
| Q | Quebec Time Zone | Military | UTC - 4 hours |
| R | Romeo Time Zone | Military | UTC - 5 hours |
| S | Sierra Time Zone | Military | UTC - 6 hours |
| T | Tango Time Zone | Military | UTC - 7 hours |
| U | Uniform Time Zone | Military | UTC - 8 hours |
| UTC | Coordinated Universal Time | Europe | UTC |
| V | Victor Time Zone | Military | UTC - 9 hours |
| W | Whiskey Time Zone | Military | UTC - 10 hours |
| WEDT | Western European Daylight Time | Europe | UTC + 1 hour |
| WEST | Western European Summer Time | Europe | UTC + 1 hour |
| WET | Western European Time | Europe | UTC |
| WST | Western Standard Time | Australia | UTC + 8 hours |
| X | X-ray Time Zone | Military | UTC - 11 hours |
| Y | Yankee Time Zone | Military | UTC - 12 hours |
| Z | Zulu Time Zone | Military | UTC |

FIG. 3-C

METHOD AND SYSTEM FOR IDENTIFYING USERS AND DETECTING FRAUD BY USE OF THE INTERNET

CROSS-REFERENCE

This application is a continuation-in-part application of U.S. patent application Ser. No. 10/791,439 filed on Mar. 2, 2004, and this application also claims the benefit of priority to U.S. Provisional Patent Application Ser. No. 60/694,768 filed Jun. 27, 2005, which are incorporated herein by reference in their entirety.

BACKGROUND OF THE INVENTION

The invention relates to Internet purchasing or e-tail transactions and specifically to detecting fraud in such transactions when ordering products, services, or downloading information over the Internet.

There is a continuing need to develop techniques, devices, and programs to detect and prevent Internet fraud. The invention provides a method and a system for detecting and preventing Internet fraud by utilizing and analyzing a number of parameters to uniquely identify a customer and a potential fraudulent Internet-based transaction.

DESCRIPTION OF THE PRIOR ART

Many methods and systems have been developed over the years to prevent or detect Internet fraud. Today, to gain consumer confidence and prevent revenue loss, a website operator or merchant desires an accurate and trustworthy way of detecting possible Internet fraud. Merely asking for the user name, address, phone number, and e-mail address will not suffice to detect and determine a probable fraudulent transaction because such information can be altered, manipulated, fraudulently obtained, or simply false.

Typically, an Internet user who accesses a website for obtaining a service, product, or information, not only enters personal information as mentioned above, but is also requested to provide a credit card account number, expiration date, and billing address. An online criminal seeking to obtain goods, services, or access to information (text and/or visuals over the Internet) commonly uses someone else's credit card information to obtain the services or products during the transaction. To prevent such occurrences, websites, via credit card companies and banks, often check to see if the address on the order corresponds or matches the address for the credit card owner. Although billing and shipping addresses can differ, such as when someone purchases a gift for another, it is a factor to consider in the verification process. Additionally, merchants utilize phone number matching between that of the Internet order and the credit card company database. Another commonly used technique for order verification is e-mail address verification where the website operator sends a message to the user e-mail address asking the customer to confirm the order prior to executing the same. Yet, online thieves frequently use e mail addresses from large portal sites that offer free e-mail accounts. These e-mail addresses are easily disposable and make it harder for the website operator to identify the fraudulent customer before executing the transaction.

More sophisticated websites now capture a variety of parameters from the user known as Common Gateway Interface parameters (CGI parameters). These parameters commonly include non-personal information such as a user Internet Protocol Address (IP Address). Every computer connected to the Internet is assigned a unique number known as its Internet Protocol (IP) Address. Much like a phone number in a home or office, an IP address can be used to identify the specific user or at least the particular computer used for an Internet transaction. In addition, since these numbers are usually assigned in country-based blocks, an IP address can often be used to identify the country from which a computer is connected to the Internet. Yet, IP addresses can change regularly if a user connects to the Internet via a dial-up connection or reboots their computer. Online thieves also have ways of scrambling their IP addresses or adopting another IP address to make it nearly impossible for the website operator to identify the true user. Thus, websites typically use an IP address plus a further non-personal identifier such as a Browser ID (or user agent), a cookie, and/or a registration ID to try to identify a unique user and to prevent fraud in a second transaction.

A Browser ID provides the website operator with a wealth of information about the user such as the software being used to browse or surf the Internet. Additionally, the Browser ID includes information about the user computer operating system, its current version, its Internet browser and the language. Thus, the Browser ID has valuable information for identifying a unique user. The Browser ID may also have more detailed information such as the type of content the user can receive; for example, this lets the website operator know if the user can run applications in FLASH-animation, open a PDF-file, or access a Microsoft Excel document. Yet, Browser IDs from different computers can be similar, as there are so many Internet users and thus many have similar computers with the same capabilities, programs, web browsers, operating systems, and other information. A cookie refers to a piece of information sent from the web server to the user web browser which is saved on the resident browser software. Cookies might contain specific information such as login or registration information, online 'shopping cart' information, user preferences, etc. But cookies can easily be deleted by the computer user, by the browser, or turned off completely so that the server cannot save information on the browser software. Thus, cookies alone cannot serve as a unique identifier to thwart an Internet thief.

Accordingly, what is needed is a method and system that overcomes the problems associated with a typical verification and fraud prevention system for Internet transactions particularly in the purchasing of services, products, or information by uniquely identifying each consumer. Then, when that consumer seeks a second fraudulent purchase, the website operator will detect the same and block the order or, at least, obtain more information to ensure the order is legitimate. The system should be easily implemented within the existing environment and should be adaptable and compatible with existing technology.

SUMMARY OF THE INVENTION

In accordance with the invention, a method and system is provided for detecting potentially fraudulent transactions over the Internet. The method and system comprises obtaining information relating to the transaction from the consumer and combining this information with a unit corresponding to the change of time, a delta of time parameter, to create a unique computer identifier. If a future transaction involves an identical computer identifier, as described below, which was previously engaged in a fraudulent transaction, the website operator can choose to cancel the transaction, pursue legal action, seek further verification, or the like. By using information relating to the first transaction, such as the IP address and/or Browser ID, and combining it with the delta of time parameter, as detailed herein, the website host can more accurately preventively track fraudulent users online by comparing computer identifiers to each other. In so doing, an integrated fraud prevention system is provided which allows the website host, merchant, or the like, to accurately and efficiently determine the validity or fraudulent quality of a transaction sought to be transacted over the Internet.

Accordingly, the invention provides a method and system for improving fraud detection in connection with Internet transactions. Various embodiments of the invention utilize existing technological capabilities to prevent online thieves from making second fraudulent transactions.

Another aspect of the invention provides methods and systems for detecting and preventing Internet fraud committed as a result of "scams" or deceptive practices developed to acquire personal, confidential and/or financial information. The concepts of the invention described above may be characterized as "fingerprinting" techniques and methods to identify and/or prevent fraud involving information obtained through Internet scams. These unlawful practices will likely continue as new techniques are developed in addition to schemes already known to those in field today such as phishing, pharming, spoofing, session cloning and other deceptive practices. It shall be understood that the clock based or delta of time parameters provided herein can be used within the scope of the invention either alone or together with other known or future developed fraud parameters in the fight against online fraud and Internet scams. The various methods and systems provided in accordance with the invention offer improved and enhanced fraud detection and/or prevention solutions for e-commerce and Internet based transactions. These solutions provide a degree of invisibility to users and fraudsters alike and do not require any or all of the following: user interaction (less likelihood for mistakes or carelessness), opt-in (no adoption issues and full coverage of anti-fraud measures can be provided), change in customer behavior (no confusion as to what actions need be taken or avoided), downloads or cookies (no compatibility issues with user computers or browsers). Moreover, these Internet based solutions generate low false-positives and false negatives so as to minimize loss of business for mistakenly turning down legitimate transactions and successfully rejecting transactions that are fraudulent. The invention can incorporate a type of link analysis on user information from compromised accounts to identify a fraudster and/or the computer used to conduct fraudulent transactions online.

The features and advantages to various aspects of the invention are readily apparent from the following detailed description of the best mode for carrying out the invention when taken in connection with the accompanying chart and other portions of the specification and figures herein.

INCORPORATION BY REFERENCE

All publications and patent applications mentioned in this specification are herein incorporated by reference to the same extent as if each individual publication or patent application was specifically and individually indicated to be incorporated by reference.

BRIEF DESCRIPTION OF THE DRAWINGS

FIG. 1 is a chart that illustrates the versatility and accuracy of the invention in weeding out possible fraudulent online transactions.

FIG. 3 is an index of different Time Zones around the world.

DETAILED DESCRIPTION OF THE INVENTION

The present invention relates to a method and system for detecting potentially fraudulent transactions over the Internet. Various modifications to the preferred embodiment will be readily apparent to those skilled in the art and the general principles herein may be applied to other embodiments. The present invention is not intended to be limited to the embodiment shown but is to be accorded the widest scope consistent with the principles and features described herein. It is to be understood that the website, its host, or operator does not have to be a merchant of goods.

The present invention provides a fraud prevention system for online transactions by uniquely identifying a customer based on a number of parameters at least one of which is a delta of time parameter and another of which is another Internet related parameter, preferably the Browser ID of a computer.

Referring to the chart shown in FIG. 1, what is shown is a series of typical transactions on the Internet between a merchant and several customers. Each customer establishes a connection between his computer and the merchant's website. Upon making this connection, the merchant's website receives some non-personal identification information from the customer. This non-personal information typically includes Common Gateway Interface (CGI) parameters such as the customer's Internet Protocol (IP) Address and the computer's Browser ID. While "hackers" can change, disguise, and/or emulate the IP address to mask a fraudulent transaction, most do not now have the capability nor the idea to do the same for the Browser ID. While some "hackers" can change the Browser ID, it is not a trivial tool and if one needs to change it all the time it is not allowing those thieves to easily steal, hence, they are likely to go to a site that does not check Browser IDs. In a typical embodiment, when the customer decides to purchase services, goods, or information from the website, the customer must input additional and more personal information. This personal identification information may commonly include the customer's name, address, billing and shipping information, phone number, and/or e-mail address. A key feature of the present invention is that the website server also captures the local time of the customer's computer, typically through a program such as Javascript, as well as the local time of the server's computer. The server then calculates the time difference (or delta of time) between the customer's computer clock and the server's computer clock. This can be recorded in any desired format such as hours, minutes, seconds, or the like, but corresponds to a delta of time parameter. The delta of time parameter, the non-personal information, including but not limited to the preferred usage of the Browser ID, and/or the personal information are stored by the merchant and used to uniquely identify the customer.

Figure 2:
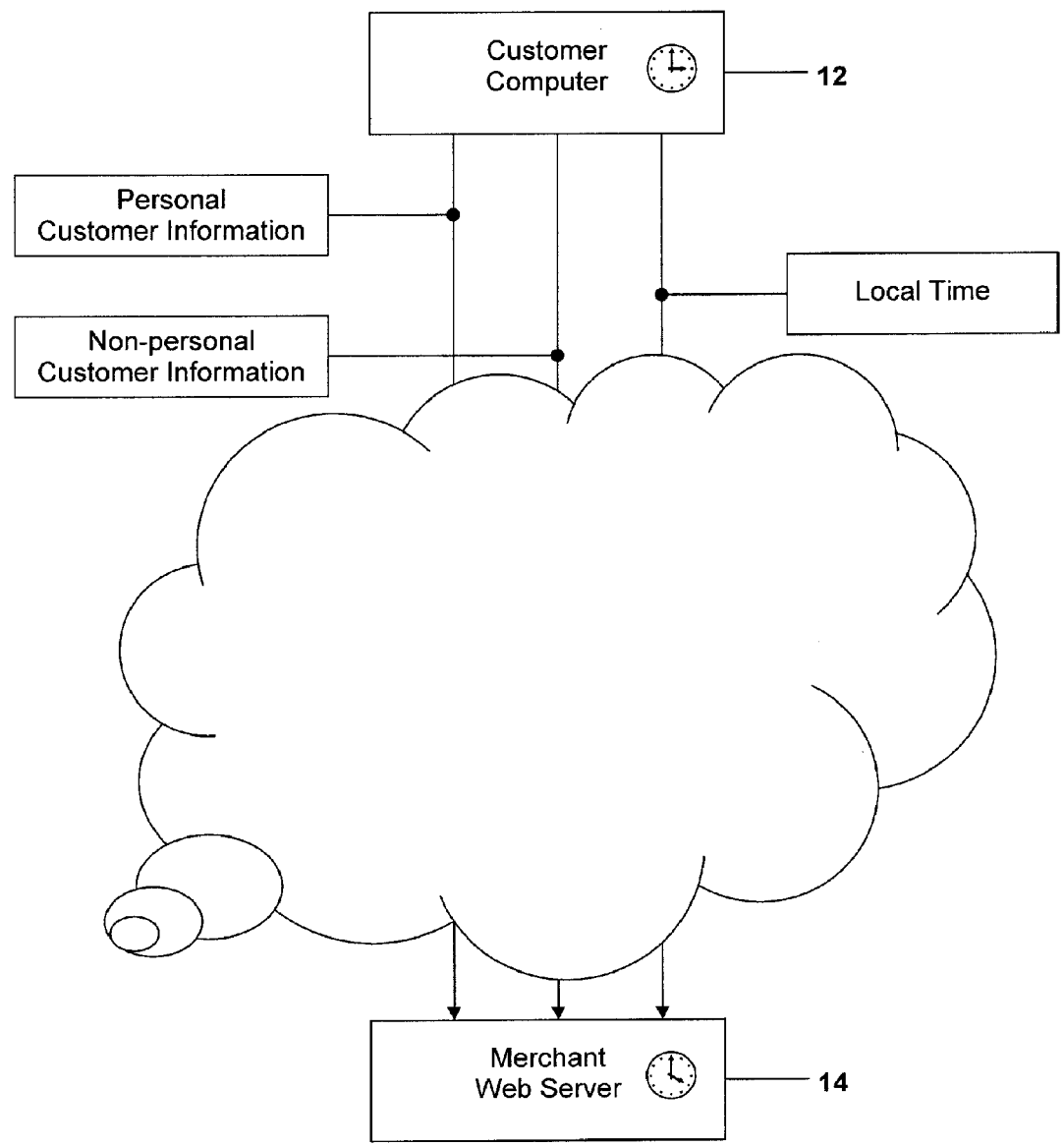
FIG. 2 describes a connection between a customer computer and a merchant website server whereby each device maintains respective times according to a resident clock.

As shown in FIG. 2, a connection may be established between a customer computer 12 and a merchant website server 14. Upon making the online connection, various information is transmitted by the customer computer 12 that may operate as a unique user and/or computer identifier. This information may include personal information specific to the customer, non-personal information corresponding to the customer computer, and the local time according to the customer computer. The merchant website can receive non-personal customer information including CGI parameters such as the customers IP address and computer Browser ID. The customer can further input personal information when making a purchase from the website including a customer name, address, billing and shipping information, phone number, and/or e-mail address(es). In accordance with this embodiment of the invention, the relative customer computer local time according to its resident clock may be captured, typically through a program such as Javascript or any other time indicator employed by telecommunications and networking systems such as timestamps within transmitted data packets (e.g., TCP timestamps in packets within a data stream wherein each packet includes a header portion containing a 32-bit timestamp generated by a originating computer according to local resident time). The local time of a customer computer or client may be captured during any selected moment of action such as when the customer visits or is logging into a merchant site, at the time of a purchase or at times during an exchange of information that can be reflected in timestamp to data packets transmitted across a selected network or the Internet. At the same time, the merchant web server also maintains and measures a relative website server local time according to a resident clock. The time difference or delta of time as between the customer computer clock and the servers computer clock can be therefore calculated. This approach in determining when to measure a time of action or event may be characterized as opportunistic in that measurements are taken at selected moments in time. The delta of time can be measured, calculated and recorded by the merchant web server or any other computer operating with or connected to the merchant online system. The delta of time may be measured in any desired format or increments of time such as hours, minutes, seconds, milliseconds (microseconds) or the like. Over different periods of time, the delta of time parameters are generally persistent with relatively high degree of accuracy. Accordingly, the measured time difference between these computer clocks provides a fraud parameter in accordance with this aspect of the invention that may link or associate a particular customer computer with transactions that may involve fraud.

The delta of time (Time Diff) parameter provided in accordance with this aspect of the invention may function alone or combined with other parameters to provide what may be characterized as a "PC fingerprint." Such devices include personal computers or any other type of computing devices or computers including those from Apple Computer, Inc. (hereinafter collectively PC). Each PC connected to the Internet may be configured slightly different and may possess identifiable characteristics distinguishing it from other devices which can be exploited by the invention. A more accurate PC fingerprint may be generally developed by considering a greater number of available computer related parameters. The Time Diff parameter may serve as part of a PC fingerprint for identifying a device which serves as a distinctive mark or characteristic about a particular user device. In addition to a Time Diff parameter, the flow of information exchanged during an Internet session may be captured and provide significant information about the user device on the other end. This type of information exchange considered by the invention is preferably invisible and transparent to users, and does not rely on user action or modification of online behavior. The Time Diff parameter may thus link incidents involving fraud, hacking, phishing etc. by automatically correlating information such as login data, computer data and customer data. For example, by analyzing data sent from the user device, information about the device and browser used by an individual may be obtained such as a Browser ID, the Browser/device IP address and the particular Browser language. By formulating a more accurate PC fingerprint, there is less likelihood of mistakenly associating a user with a fraudulent transaction (false positive) during e-commerce transactions, or failing to detect a fraudster. Other applications of the invention include national security and law enforcement whereby a computer can be uniquely identified in a manner similar to way thieves can be identified by a physical fingerprint. Accordingly, a PC fingerprint provided by the invention enables the ability to link and connect different online accounts and activity to a same device.

The Time Diff parameter provided in accordance with the invention may be captured or measured during various selected moments of action during an Internet session such as the login step or procedure. Today it is estimated that medium to large e-commerce merchants and financial institutions receive over 5,000 orders per day for digital and shipped goods, and over 100,000 logins per day. Many Internet Service Providers (ISPs) also manage accounts and user logins on an enormous scale also. This aspect of the invention can be applied to broader applications online to authenticate a user or uniquely identify a computer on the Internet in addition to e-commerce transactions and fighting fraud or identify theft. For example, the invention may be applied where a merchant or financial institution (FI) server resides in California, USA and a valid customer (Customer) who also normally resides in California, USA. It shall be understood that the following examples below describe login procedures which could be modified according to the invention for any other selected moment of action during an Internet session such as logout procedures, when a user clicks a "submit" button within a user interface, or transmission of any other information between users online.

During a "valid" login procedure, the Customer may initiate a login procedure from a web browser on a computer that registers a time according to its clock as follows: Time=11:00 am/Time Zone: GMT −8 and an IP address from the California region. Meanwhile, from the perspective of the FI, the recorded time at the FI server according to its respective clock may be: Time=11:01 am/Time Zone: GMT −8 and an IP address from the California region. It shall be understood that the invention may incorporate IP address locator tools which determine an identifier for an online device and its location based on geographic regions within a country or around the world. Upon analysis of this information from the Customer that may be reflected on a conceptual or actual Score Card, which can be calculated and stored in memory within the server of the FI or any its other network computers, the FI can determine whether there is a match indicating a valid user login. Accordingly, the exchange of information in the above described example may be reflected as a match on or as a Score Card that measures the validity of the customer: Time Diff=Match/Time Zone=Match/IP=Match.

During a "suspect" login procedure, a Customer may initiate a login procedure from a web browser on a computer that registers a time according to its clock as follows: Time=10:02 pm/Time Zone: GMT +3 and an IP address from a region in Russia. Meanwhile, from the perspective of an FI, the recorded time at the FI server according to its respective clock may be: Time=11:01 am/Time Zone: GMT −8 and an IP address again from its California region. Upon analysis of this information from the Customer in accordance with the invention, the Time Diff and Time Zone measurements as between the Customer and the FI are different from prior valid logins and therefore not a match. Furthermore, the IP address received by the FI indicating a device outside of the California region would not be a match and further suggest an invalid login attempt by a fraudster or other unauthorized individual. The Score Card for this login example measuring the validity of the customer can thus show: Time Diff=No Match/Time Zone=No Match/IP=No Match. The FI would be thus alerted that the alleged Customer attempting to login was likely invalid.

During a "valid" login procedure from a Customer traveling with a computer and browser in London, the Customer may initiate a login procedure at a registered time according to its clock as follows: Time=11:00 pm/Time Zone: GMT −8 and an IP address from a region around London. Meanwhile, from the perspective of an FI, the recorded time at the FI server according to its respective clock may be: Time=11:01 am/Time Zone: GMT −8 and an IP address again from its California region. Upon analysis of this information from the Customer, the Time Diff and Time Zone measurements as between the Customer and the FI are the same as prior valid logins and therefore a match. While the IP address received by the FI indicating a device outside of the California region would not be a match and suggest an invalid login attempt, the comparison of the Time Diff and the Time Zone measurements would be a match. Because the Time Diff parameter provided in accordance with the invention can be used in combination with other fraud parameters for authentication and identification, a Score Card for this login example measuring the validity of the customer could still show a match nevertheless: Time Diff=Match/Time Zone=Match/IP=No Match.

The Time Diff parameter provides fraud detection tools for online merchants, financial institutions and other parties conducting commerce on the Web. These tools can be applied to combat well recognized problems such as reducing the number of false positives which reduce possible revenue from mistakenly identified valid users. In addition, Time Diff based tools provide an effective solution to identifying and preventing fraud during the course of international and overseas transactions where there are significantly increased risks of fraudulent activity. Accordingly, the Time Diff parameters herein allow the creation of a more accurate and relevant geo-location or PC fingerprint for many different types of online transactions around the world.

It shall be understood that the Time Diff parameters provided in accordance in this aspect of the invention may be defined as the difference in the registered computer times as measured in any unit of time (e.g., hours, minutes, seconds, milliseconds, microseconds) between any selected computers either alone, or in combination with the Time Zone herein or any other temporal characteristics. Furthermore, as with other embodiments described herein, the concepts of the invention can be preferably applied to e-commerce transactions to deter or identify fraud but is not limited thereto and are equally applicable to any other online application to uniquely identify and link a computer device on the Internet according to a Time Diff parameter. While consideration of Time Diff parameters alone may not be completely effective as with any solution against fraud, phishing etc., the PC fingerprinting methods and techniques provided herein enables effective link analysis between computer devices and compromised accounts or any other transaction having or associated with a fraudulent past or history. By following and learning from historical incidents of security breaches and fraud, the invention can quickly pinpoint repeat offenders and build a stronger defense against different criminal behavior or schemes now known and those that will be developed in the future.

Another embodiment of the invention provides a delta of time (Delta Time) parameter that can be calculated based on the local time as indicated through the browser of a client computer (Browser Time) and the local time as determined at a server (Server Time)—also applicable in FIG. 2. The Delta Time may operate as a fingerprint for a particular client computer or computer and assists in uniquely identifying it from other computers on the Internet or selected network. Each local time for any client or server connected to the Internet or other network system can be measured according to the clock for that particular device. The measured Delta Time parameter for any selected moment of action in accordance with the invention may be perceived as having two temporal components: an actual time and a time zone. For example, the measured local time at a client site may include a Browser Time of Feb. 1, 2005 14:00:00 PM, and a Browser Time Zone of GMT −8. The measured local time at a server site may include a Server Time of Feb. 1, 2005 17:01:13 PM, and a Server Time Zone of GMT −5. The Delta Time as between the Browser Time and the Server Time, and the Browser Time Zone in comparison to the Server Time Zone, can be therefore calculated in accordance with the invention.

A preferable embodiment of the invention provides a Delta Time or time differential which takes into consideration daylight saving time (DST) in selected time zones and countries around the world such as those identified in FIG. 3. In addition to collecting respective local times and time zones from clients or customer computers and website servers at a current selected date or moment of action, a website server or any other network computer can also capture information relating to particular time and time zones for selected (future or even past) dates. A selected Delta Time during DST (DST Delta Time) can be determined for a particular customer or client computer when the registered time for such other date is different than the current selected date. For example, the Delta Time value for such other date(s) can be +/−one hour ahead or behind. For time zones that do not observe DST, the Delta Time value will remain unchanged during such dates when DST would be normally observed. By calculating and identifying values for Delta Time and relevant Time Zones for multiple dates ahead of time in accordance with the invention, accurate delta of time values can be provided to assist in uniquely identifying or fingerprinting a client or customer computer throughout the year regardless of whether DST is observed in the relevant country or region of the world. Because only certain countries and regions of the world observe DST while others do not, it may be possible to pinpoint in which location the device resides based at least in part on the geo-location fingerprints provided by the invention.

DST (also called Summer Time) is the portion of the year in which the local time of a region is usually advanced by one hour from its official standard time. This system was originally intended to "save" daylight, as opposed to "wasting" time (for example, by sleeping past sunrise). The official time is adjusted forward during the spring and summer months, so that the active hours of daily life involving events such as work and school will better match the hours of daylight in theory. Today approximately 70 countries utilize DST in at least a portion therein—the only major industrialized country not to have introduced daylight saving is currently Japan. DST begins for most of the United States of America at 2 a.m. on the first Sunday of April and clocks are turned (spring) forward one hour. Time reverts to standard time at 2 a.m. on the last Sunday of October and clocks are turned (fall) back one hour. Each time zone switches to and from DST at a different time. Furthermore, legislation may be passed by Congress and other state governmental bodies from time to time on whether to observe, shorten or lengthen DST. DST for the United States of America and its territories is not observed in Hawaii, American Samoa, Guam, Puerto Rico, the Virgin Islands, most of the Eastern Time Zone portion of the State of Indiana, and the state of Arizona (except the Navajo Indian Reservation which does observe DST). Meanwhile, for all countries in the European Union except Iceland, Summer Time begins and ends at 1 am Coordinated Universal Time, UTC (Greenwich Mean Time, GMT) which generally starts on the last Sunday in March, and ends the last Sunday in October. All time zones change at the same moment in the EU. It shall be understood that observance of DST is controversial and ever changing so the delta of time parameter provided in accordance with this embodiment of the invention can be flexibly adapted to devices all over the world when it changes and whether or not DST is observed in certain countries or states within particular time zones.

In this embodiment of the invention, various time zones as shown in FIG. 3 can be predetermined such that it is known ahead of time whether or not DST is applicable for that region. For example, a Delta Time parameter may be calculated for a client computer at some future date(s) during DST. When the clock of a client computer registers a time of 8:00 pm PST (Greenwich Mean Time GMT −8) on a selected date during the fall season, its respective delta of time is changed one hour ahead to 9:00 pm PST (GMT −8) on a selected date in the spring season to account for DST when applicable. By collecting and determining times at one or more selected dates in the future, it is possible to determine whether a device will or will not go into DST from the beginning rather than waiting until later to see whether the registered time is the same or different. This will also assist in identifying the country or region for a selected user device. Accordingly, seemingly unrelated transactions can be linked at least in part from a distinctive timestamp delta of time (Delta Time) that can be measured from the internal clock or data (TCP, NTP, RTP etc. timestamps within data packets) sent from the device. It should be understood that the Delta Time parameter can be calculated according to any selected units of time as with other embodiments of the invention herein such as minutes, seconds, or milliseconds.

Figure 4:
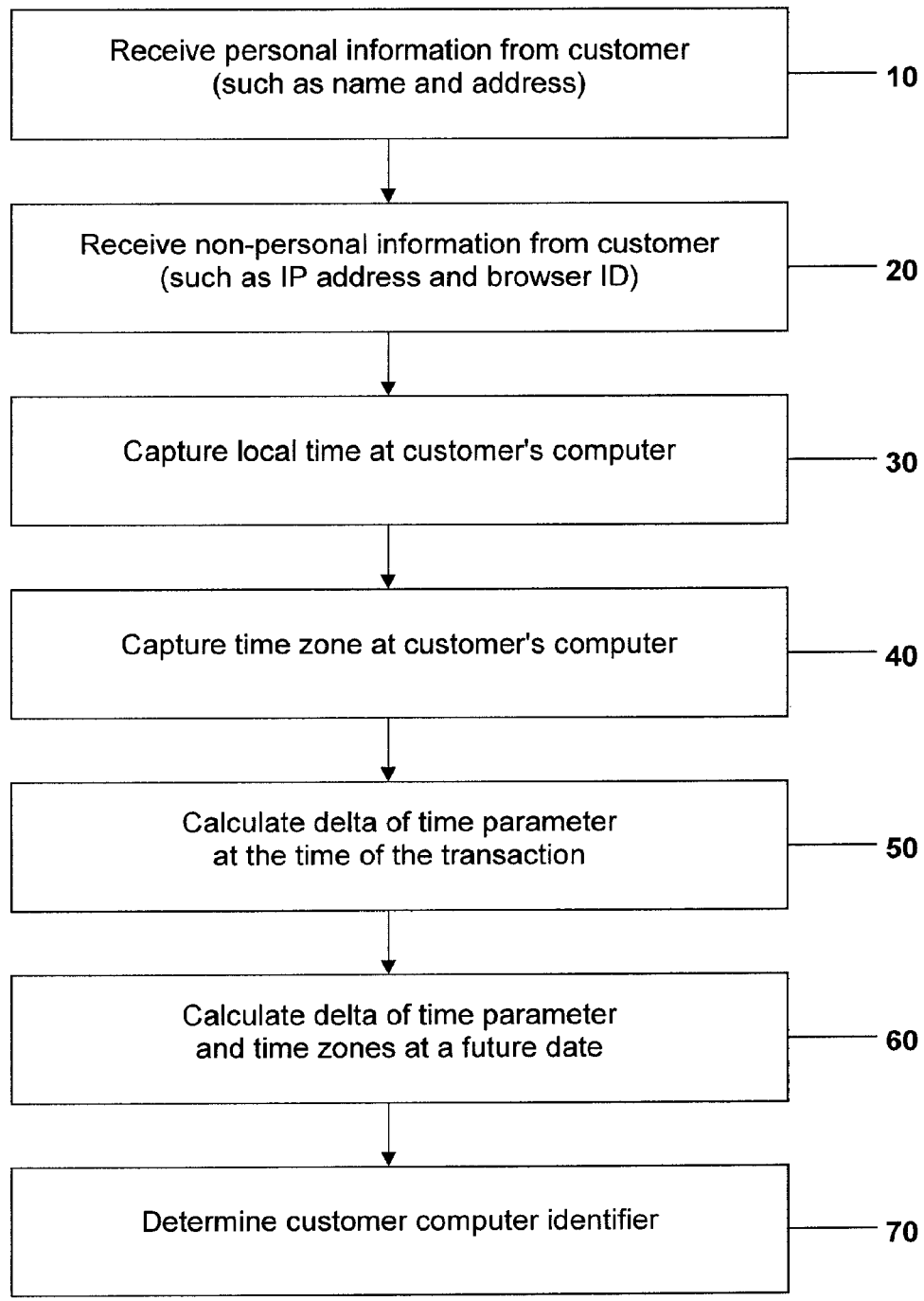
FIG. 4 is a flowchart describing an embodiment of the invention that provides a customer computer identifier.

FIG. 4 is flow chart depicting another aspect of the invention that provides methods for determining a customer computer identifier (CI) used in detecting fraud in connection with online commercial transactions. At step 10, a merchant web server receives customer personal information, such as name, address, phone number, etc. At step 20, the web server receives non-personal information from the customer such as IP address and Browser ID. At steps 30 and 40, the web server captures the local time and the time zone at the customer computer. The delta of time parameter is then calculated at the time of the transaction at step 50. It should be noted that the delta of time parameter may be calculated at the time of the customer login, other times during a transaction or at any selected moment of action. At step 60, the delta of time parameter and time zones are calculated at one or more future selected dates. Using the customer information and the delta of time parameters, the customer computer identifier is determined at step 70. Any one or more of these steps may be used in combination with each other and in a different order of operation depending on selected applications. It should be further understood that processes in accordance with this embodiment of the invention may provide a delta of time parameter and a computer identifier described elsewhere herein and also used together with other aspects of the invention, e.g. FIG. 2.

Figure 5:
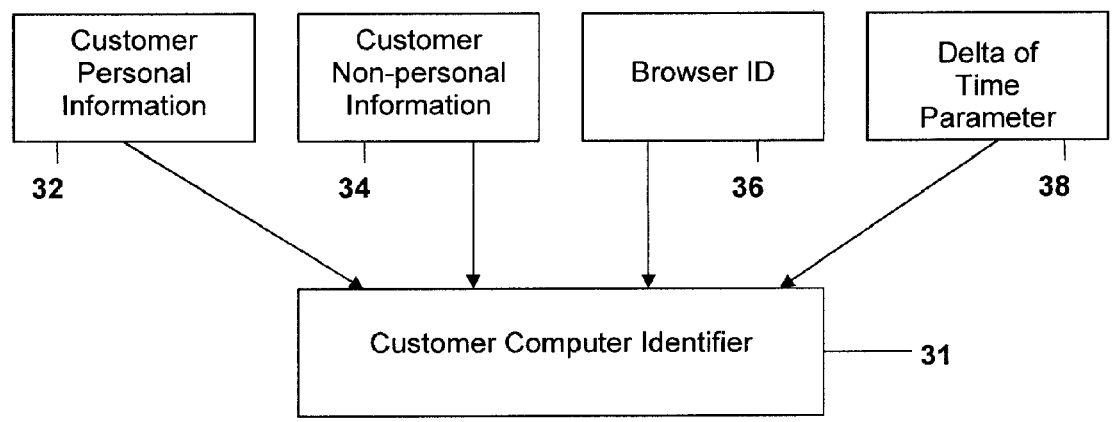
FIG. 5 describes components of a customer computer identifier provided in accordance with the invention.

In another preferable embodiment of the invention, as illustrated in FIG. 5, a particular subset of selected parameters or fields can combined or aggregated to construct a customer computer identifier 31. For example, the customer computer identifier 31 can be determined based on selected customer personal information 32, customer non-personal information 34, including a Browser ID 36 and a delta of time parameter 38. These selected parameters are not meant to be limiting and other information or fraud parameters described herein or otherwise known to those of ordinary skill may be used to create a customer computer identifier 31. Specifically, another preferable embodiment of the invention includes a customer computer identifier consisting of a delta of time parameter plus a Browser ID alone which can be used to identify or "fingerprint" a user computer. But the selected customer information 32 alone is not entirely reliable by itself as it can not be easily validated as suggested above. Nevertheless when combined with non-personal information 34, and in particular a measured delta of time parameter, other embodiments of the invention may provide reliable and effective methods of identifying computers on the Internet such as those associated with known fraudulent transactions. The delta of time parameters provided in accordance with this and other aspects of the invention herein offer fingerprinting capabilities that uniquely identify particular computing devices used in e-commerce transactions. Because computer users rarely personally change the internal clocks within their computers, the delta of time parameter will likely be the same (or within a range or within predictable limits) for a computer every time that computer is used to conduct an online transaction with the same merchant even if the user disguises or changes the IP address. The Browser ID is also not likely to be changed, even by a consumer seeking to perpetuate a fraudulent transaction. Thus, the delta of time parameter (the difference between the time of day of the computer user's clock and the time of day on the website's server clock as in FIG. 2) is an important component of the computer identifier because it, along with the preferred Browser ID or other personal or non-personal information, is a good indication of the identity of a subsequent user on the same computer. The delta of time parameter also allows the merchant to potentially locate the computer in terms of a time zone, region, or country.

Accordingly, once a merchant determines that a first fraudulent transaction may have been made, the merchant can flag the customer computer identifier, i.e. Browser ID and delta of time. In a preferred embodiment, the computer identifier will include at least its delta of time and Browser ID, but may also include other personal and/or non-personal information. Then, the matching parameter can be used to identify a subsequent transaction which reveals a user with an identical set of computer identifiers. The matching is typically implemented by software, for example, on a hard disk, floppy disk, or other computer-readable medium.

Figure 6:
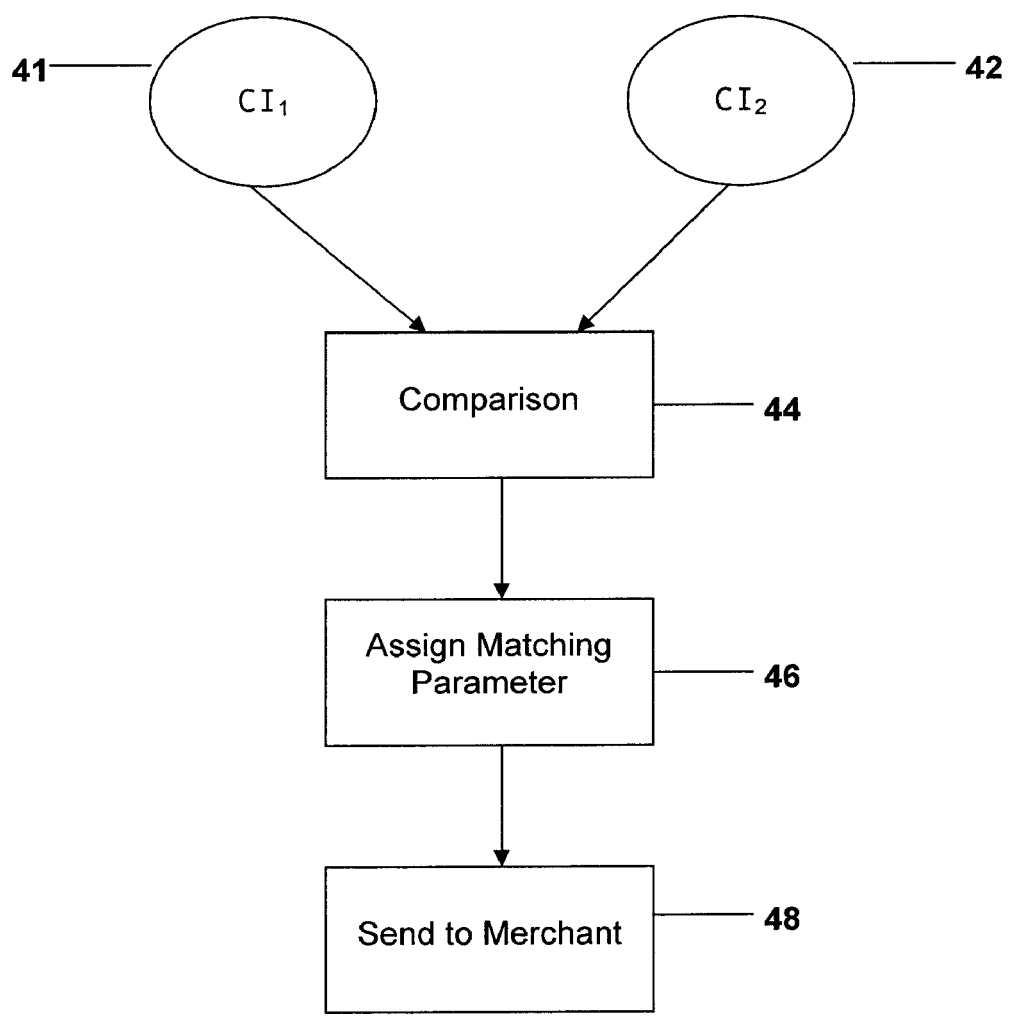
FIG. 6 illustrates a comparison of computer identifiers that provides a matching parameter for consideration by an online merchant.

A flowchart is provided in FIG. 6 that illustrates methods to detect fraud according yet another embodiment of the invention. Once a merchant web server determines the computer identifier (CI) for a first transaction, $CI_1$ 41 and a subsequent transaction, $CI_2$ 42, a comparison can be made as between the two identifiers 41 and 42 and performed at step 44 as illustrated. After the comparison has been made, a computer implemented software program may continue to execute the next step of assigning a matching parameter value to the pair of transactions based on the similarities between the first and subsequent transactions, at step 46. At step 48, the website server running the program to compare computer identifiers may inform the merchant of the matching parameter value, which in turn may provide information suggesting to cancel or confirm the transaction, inform the costumer status order, demand more information, or the like. The merchant may then choose its desired course of action. It shall be understood that the memory of a merchant web server may contain software programs with instructions to perform any combination of these steps to provide these and any other methods described herein in accordance with the invention.

Figure 7:
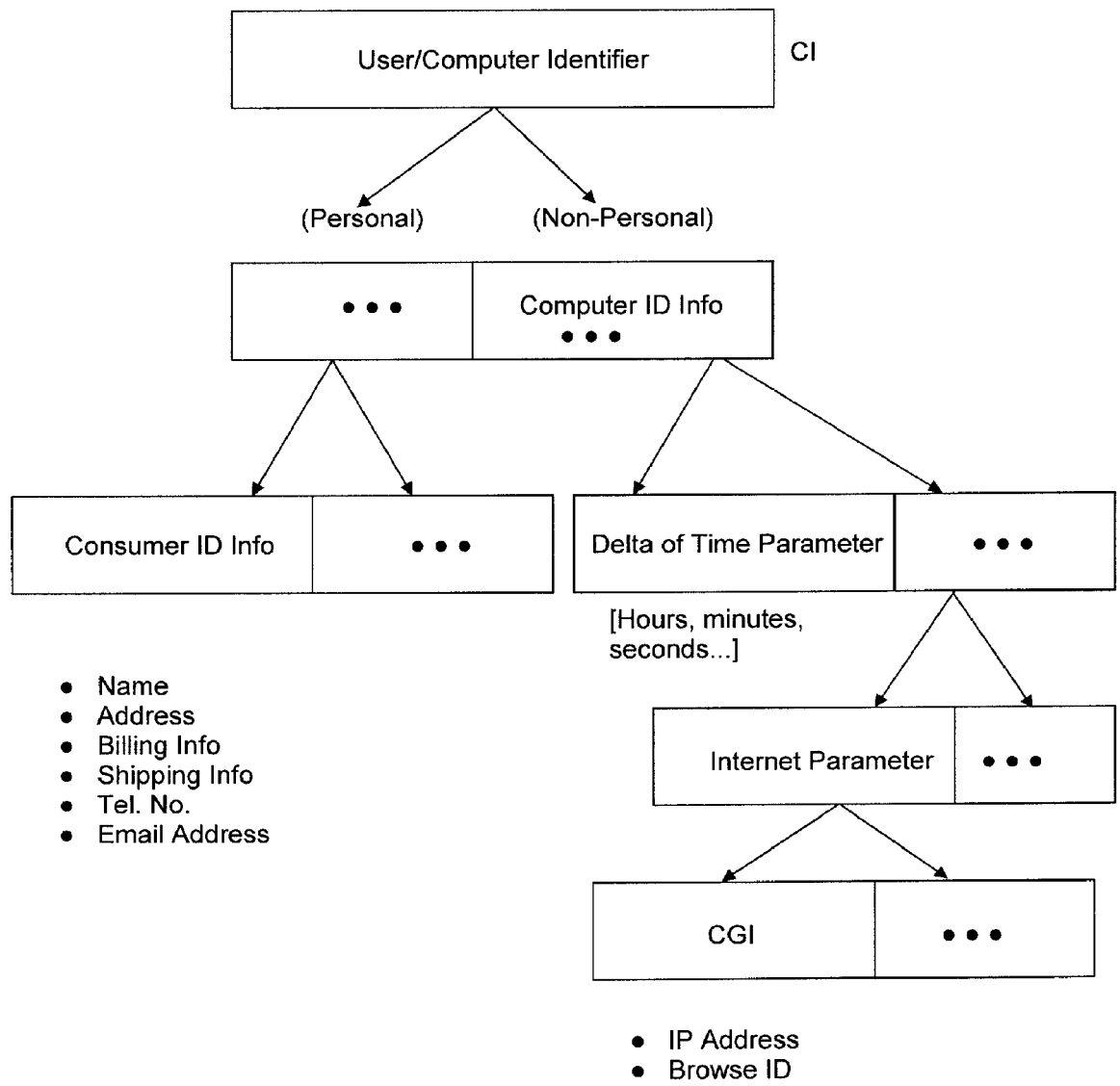
FIG. 7 shows various components and parameters that may comprise a user computer identifier in accordance with an embodiment of the invention.

FIG. 7 provides a hierarchical representation of user computer identifiers (CIs) for the identification and prevention of online fraud that may be generated as described with the various embodiments of the invention. A computer identifier (CI), which may uniquely identify a computer associated or linked to known fraudulent transactions (or for alternative purpose described herein), may comprise both personal and non personal parameters. Personal parameters may include consumer identification (ID) information and other selected personal parameters. Examples of selected consumer ID information include but are not limited to the following: user or personal name, address, billing information, shipping information, telephone number(s), e-mail address(es). Meanwhile, non-personal parameters may include a variety of known fraud parameters including computer identification (ID) information. This includes delta of time parameters as described herein which may be measured in any increment of time such as hours, minutes, seconds and milliseconds. Other computer ID information includes Internet Parameters such as Common Gateway Interface (CGI) parameters including a customer computer Internet Protocol (IP) Address and Browser ID.

A particularly important feature of the present invention is the merchant's ability to include, remove, and weigh each parameter within the computer identifier. For example, the merchant may choose to only use the delta of time parameter and Browser ID to form the unique computer identifier. Accordingly, the merchant may set the matching parameter to fit a level of comparison between the first and subsequent transaction. For example, since deltas of time may slightly change because of the differences in accuracy between the server and the user computer clock mechanism, computer clocks and deltas may slightly vary over time. The merchant may set the matching parameter to include a range of delta of time, such as a few minutes, instead of an exact match. This way, even if the user computer "loses time," the matching parameter will still identify the subsequent transaction as a potential fraudulent one based on other information within the computer identifier.

Figure 8:
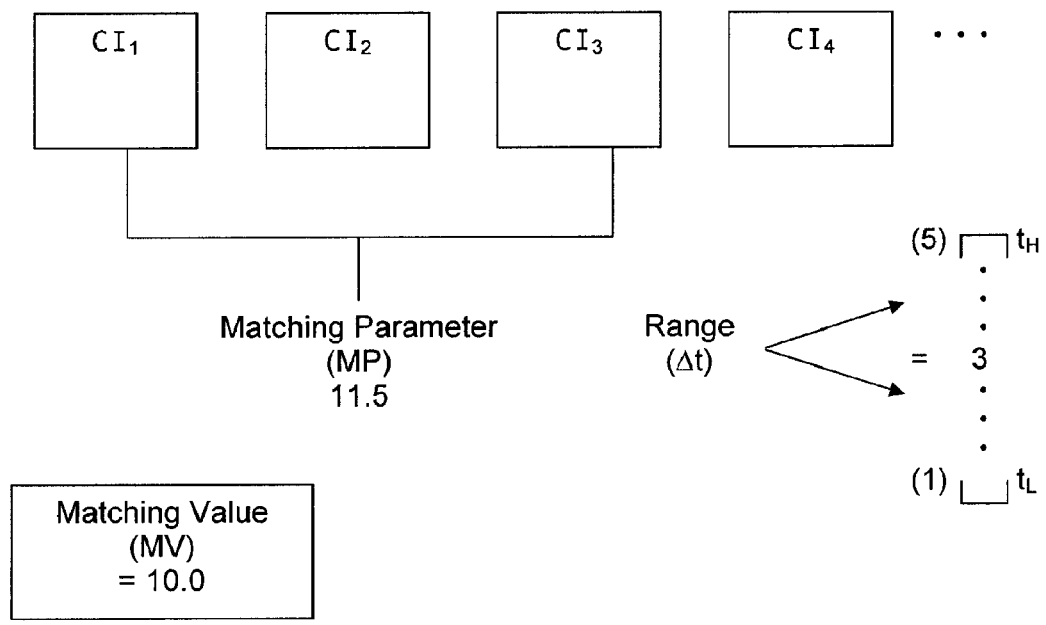
FIG. 8 depicts the comparison between multiple computer identifiers to provide a matching parameter that can be compared against a preselected matching value.

A series of computer identifiers (CIs) are shown in FIG. 8 which can be matched, e.g., $CI_1$-$CI_4$ . . . . When a CI is generated by a method or software program by a computer to be identified or associated with a known fraudulent transaction, it can be compared to another selected CI. During a comparison step between the two, a matching parameter (MP) may be calculated. The calculated value of the MP may consist of a raw number or score that is dimensionless, e.g., 11.5, or some increment of measurement including time, e.g., hours, minutes, seconds, milliseconds. The matching parameter may be thus compared in a next step to a preselected reference or baseline Matching Value (MV), e.g., 10.0. A merchant or anyone trying to identify the computer can variably set the MV relative to anticipated or measured MP values. Because of slight differences in computer clocks, network latency, variable Web traffic and bandwidth constraints, the delta of time parameters provided herein may vary from time to time even for the same selected computer. A preselected range (delta t) may be therefore defined in accordance with this aspect of the invention that allows for a certain tolerance setting or range (Range) of MP values relative to the MV. For example, an lower limit within the Range may allow for a [+/−1] variance of the MP value relative to the MV, or a higher limit within the Range may allow for a [+/−5] variance. When the MP value falls within the defined Range relative to the MV, this can indicate a positive match or identification (ID) of a device for various purposes as described herein such as linking a computer to known online fraudulent transactions. When the MP value falls outside of the defined Range relative to the MV, this can indicate a negative match or identification (ID) of a device. It shall be understood that these MP values may be alternatively defined as a Score Card value and incorporated with other corresponding aspects of the invention described elsewhere herein to detect and prevent online fraud. The matching parameters, values and ranges described in accordance with this variation of the invention can be modified and defined in a variety of ways and are not limited to those specifically provided for illustrative purposes. The preceding steps may be carried out as methods provided herein, or alternatively as a series of software program instructions and code.

Furthermore, in accordance with another concept of the invention, the delta of time parameter may be measured as between different times resulting from inherent limitations or flaws of the computer clock(s) in a single device as opposed to multiple devices. In this embodiment of the invention, a device fingerprint or PC fingerprint is created to uniquely identify and link a computer to known fraudulent transactions or behavior by measuring and tracking an inherent inaccuracy or flaw of a resident clock. In comparison to other embodiments of the invention, which may be described as an "external" delta of time as between two different devices (host server/user client), another variation provided herein provides a device identifier using what may be considered an "internal" delta of time as between a single device itself (standalone). Over a period of time, computers clocks as with other ordinary clocks are not perfect and tend to run fast or slow eventually. The rate at which time is gained or lost for a computer clock may be defined as "clock skew" and can be measured in microseconds per second (clock skew may be also defined as the instantaneous difference between readings of any two clocks or the time what a computer thinks it is as compared to another clock). If the clock has a non-zero skew, not only is the end-to-end delay measurement off by an amount equal to what can be defined as clock offset, it also gradually increases or decreases over time depending on whether it is running relatively faster or slower. Even when there is a constant clock skew, the clock offset values increases or decreases over time depending on the sign (+/−) of the skew. So any given computer or device described herein can have a single or multiple clocks (e.g., systems clock, TCP timestamps options clock) that are unable to remain consistent and accurately track time. But the clock skew of a particular device may be different from other (even seemingly identical) computers, and thus serve as a PC fingerprint linking it to certain transactions and fraud. It is generally well known that different computer systems have different and relatively constant clock skews. This imperfection or flaw in the device can thus exploited in a way to identify a particular device or computer in relation to certain transactions and behavior since it is relatively persistent and unique in accordance with the invention. The internal delta of time provided in accordance with this embodiment can be therefore applied in the same manner as any other external delta of time described elsewhere herein to provide a PC fingerprint linked to transactions carried out on devices involving e-tail or e-commerce fraud, breaches in security and various types of criminal online behavior.

In this embodiment of the invention, the delta of parameter can be measured in units of microseconds per second (ms/s, first derivative or rate at which time is gained or lost) while in other embodiments of the invention the parameter can be measured in microseconds. This delta of time parameter can therefore be defined as a time difference measured between a first clock measurement and a second clock measurement over a selected period of time or time interval. For example, the TCP timestamp of a first packet of data from a computer may indicate a time t1 (9:01 am) while a second packet may be sent at time t2 (9:02 am). The first and second packets may arrive at a server at times t3 (9:04 am) and t4 (9:07 am), respectively. The clock skew of the computer can be thus calculated as the rate at which time is lost in this instance: t3−t1=3 mins; t4−t2=5 mins (may assume time differences are not attributed to network delays, latency etc. beyond clock skew). The internal delta of time parameter or clock skew in the context of this embodiment of the invention herein may be calculated as follows: 5 mins−3 mins=2 mins divided by 3 mins (which is the selected period of time between first and second packets). In other words, during the 3 mins of time between sending the first and second data packets, the computer clock lost or ran slow 2 mins (0.666 min/min). While clock skew in general is instead measured on the order of microseconds rather than minutes, this example illustrates how these and other embodiments of the invention are not limited to certain ranges. Other units of measurements are applicable to the delta of time parameters as mentioned elsewhere herein. It shall be understood that both internal and external deltas of time can be applied individually or in combination by themselves, or in addition to other parameters as described herein to provide a distinctive PC fingerprint.

Another aspect of the invention provided herein extends to detecting and preventing fraudulent transaction based on information obtained through "scams" or deceptive practices developed to gain personal, confidential and/or financial information. For example, a common technique today known as "phishing" involves gaining personal information from an individual to commit identify theft by typically using fraudulent e-mail messages that appear to come from legitimate businesses. "Phishing" can be defined as the act of sending an e-mail to a user falsely claiming to be an established legitimate enterprise in an attempt to scam the user into surrendering private information that will be used for identity theft. The e-mail often directs the user to visit a Web site where they are asked to provide or update personal information, such as passwords and credit card, social security, and bank account numbers, that the legitimate organization already has. But the Web site to which the user is directed is phony and established to steal the user information during a fake session. For example, a widely recognized Web site, e.g., eBay, can be targeted in a phishing scam whereby users received e-mails supposedly claiming that the user account is about to be suspended unless they clicked-on a provided link and updated the credit card information that the genuine Web site already had. Because it is relatively simple to make a Web site look like a legitimate organizations site by mimicking the HTML code, people can be tricked into thinking they were actually being contacted by the Web site and will subsequently go to the fraudulent site to update or provide their account information. Moreover, by spamming large groups of people (or spIMming them which spam sent over Instant Messaging (IM) applications that can include links to fake sites), the "phisher" could rely on a response from at least some percentage of people who actually had listed credit card numbers with the Web site legitimately. The concept of phishing in general can also referred to as brand spoofing or carding, a variation on the idea whereby bait is set with the hope that some will bite despite most individuals knowing better. By way of these seemingly legitimate e-mails, criminals "go fishing" for information which is in turn later used to gain access to a real account. Such information includes commonly stolen items in identify theft including a personal identification number (PIN), user account name, a credit card number, and an account number. Regardless of how this information is obtained, the fraud detection and prevention systems provided herein incorporate unique fraud parameters such as delta of time and clock differential parameters to "phish"-out fraudsters from legitimate users.

The criminal act that is often committed after information is "phished" can be ultimately referred to as "account takeover." These scams are commonly committed by e-mail to users at least partially because millions can be rapidly and efficiently sent to random or selected individuals, but other techniques can involve transmission of a virus through attachments to e-mails. In particular, some viruses can be created to replace the universal resource locator (URL) of a merchant, financial institution or other party commonly stored in a web browser "Favorites" folder. Instead of being routed to an intended legitimate Web site, the user is sent to a fake or spoofed site where user information is shared unknowingly with a fraudster. Similar in nature to e-mail phishing, another Internet scam referred to as "pharming" seeks to obtain personal or private (usually financial related) information through domain spoofing. Rather than being spammed with malicious and mischievous e-mail requests for you to visit spoof Web sites which appear legitimate, pharming can "poison" a DNS server by infusing into it false information resulting in a user request being redirected elsewhere. A browser however will indicate the correct Web site location, which can make pharming a bit more serious and more difficult to detect. A distinction however is that generally phishing attempts to scam people one at a time with an e-mail while pharming allows the scammers to target large groups of people at one time through domain spoofing. Meanwhile, "spoofing" basically includes a variety of ways in which hardware and software can be fooled into operating as if there was a legitimate transaction or exchange taking place. "IP spoofing" more particularly involves trickery that makes a message appear as if it came from an authorized IP address, e.g., e-mail spoofing. As a result, access can be gained to computers through IP spoofing when an intruder sends messages to a computer with an IP address indicating that the message is coming from a trusted host. To engage in IP spoofing, a hacker must first use a variety of techniques to find an IP address of a trusted host and then modify the packet headers so that it appears that the packets are coming from that host.

Malicious software (aka malware) can be also involuntarily downloaded to a computer and designed specifically to damage or disrupt a system by means of a virus or a Trojan horse. A "Trojan horse" is a program that masquerades as a benign application and unlike many viruses, they do not replicate themselves but can be just as destructive. One of the most insidious types of Trojan horse is a program that claims to rid your computer of viruses but instead introduces viruses onto a computer. The concepts relating to fraud detection and prevention can be applied also to other traditional methods of stealing personal information also include e-mail or other means that involve a fake premise or story such as seeking help fleeing from a third world country (e.g., Nigerian scam) or conducting some type of customer service call or transaction (e.g., "Hello, I am from your bank . . . ").

The fundamental problem of user authentication is exploited time and time again in order to commit fraudulent transaction online. Both financial institutions and merchants face a shared problem and ultimate challenge in properly authenticating who is really on the opposite end of a transaction. Information such as account user names and passwords are useless and rendered ineffective as reliable credentials in light of phishing and other Internet fraud scams. Authentication can be attempted by obtaining various types of information broadly ranging from any or all of the following: something you have; something you know; and/or something you are (biometrics). These include information obtained from tokens (hard, soft, dynamic), shared secret or things not commonly known such as a mother's maiden, a pet's name or a favorite color. An evolving system of security certificates (encryption with public key infrastructure (PKI), secure sockets layer (SSL)) may be relied upon also to verify and authenticate the validity of a party involved in an Internet transaction. Third party bureaus are also relied upon to provide information that can be used to authenticate an individual such as D&B reports, credit histories from Equifax and other agencies, and also Caller ID to identify the number associated with a person. At the same time, a user may attempt to authenticate a merchant, bank or other party at the other end of an online transaction also. Various tool bars may be employed to allow users to verify a web site, an IP address or some other indication that a user is indeed in contact with a merchant, bank or other desired party in a transaction.

The information and actions by a party attempting to prevent or detect fraud is often met with an equally effective and opposite countermeasure by learned fraudsters. When banks or merchants create user names and passwords, they can be rendered ineffective by numerous scams and ways of obtaining user information such as phishing and key-loggers. "Key-loggers" are a type of surveillance software such as spyware that has the capability to record keystrokes to a log file (usually encrypted) made from instant messages, e-mail and any information (including e-mail addresses and Web site URLs visited) typed using a keyboard which can be later sent to a specified receiver. Key-loggers, as a surveillance tool, are often used by employers to ensure employees use work computers for business purposes only. Unfortunately, key-loggers can also be embedded in spyware allowing your information to be transmitted to an unknown third party.) Similarly, cookies that are often created to contain selected information used for identification can be simply deleted, and IP addresses that are associated with fraud can simply hide behind proxies.

Furthermore, when tokens are frequently used as a security measure to gain access to user information, the entire session or exchange can be merely cloned. The term "session cloning" may be defined as the ability of a third party to duplicate the session ID of a user and use it to interact with the web-based application at the same time as the original user. Session cloning is generally more of a threat when session IDs are predictable or obtainable, or if the site allows IP hopping. IP hopping is permitting the user to change their IP address mid-session without having to re-authenticate to the web site. To minimize fraud and prevent IP hopping, one alternative is to track the domain of the source address (remembering domains can have more than two components) and require re-authentication if the domain changes. This does not prevent IP hopping within the same ISP but does limit the exposure. Another option to minimize risk is to consider using an inactivity timeout or terminating a session after a certain period of inactivity in order to protect people who leave their accounts signed-on and their systems unattended. Regardless of these preventative measures taken against session cloning, the risk of fraud remains which provides an opportunity for the invention herein to detect and prevent such activity when an attempt is made to use information from a computer.

It shall be understood that the description of fraudulent schemes provided herein is not exhaustive and that additional techniques will be developed in the future to improperly gain access to user information. Regardless of the means and methods used to obtain such information, the concepts of the invention can be applied to detect and prevent fraud by uniquely linking or fingerprinting such criminal activity with devices based upon selected delta of time parameters, clock differentials and time based parameters provided elsewhere herein. These solutions can be implemented with no behavioral modification and have a zero imposition on a user as new ways are constantly developed to break past security barriers. The onus is not placed on the consumer to prevent attacks, nor is the consumer asked to change certain behavior to combat phishing or any other criminal behavior or scheme developed in the future.

Although the present invention has been described in accordance with the embodiments shown, one of ordinary skill in the art will recognize that there could be variations to the embodiment and those variations would be within the spirit and scope of the present invention. Therefore, although the present invention was described in terms of a particular fraud prevention method and system, one of ordinary skill in the art readily recognizes, that any number or parameters can be utilized and their use would be within the spirit and scope of the present invention.

What is claimed is:

1. A method for identifying a client computer using a website server comprising the steps of:
   providing a time capture script from the website server for execution by the client computer;
   executing the time capture script to instruct a browser of the client computer to obtain selected information about the client computer during an online connection including a local time according to a client computer clock and at least one non-personal identification parameter;
   returning the local time of the client computer clock and the non-personal identification parameter to the website server in accordance with the time capture script;
   obtaining a local server time from a website server clock;
   calculating, at the website server, a delta of time parameter based upon a difference in time between the local server time and the local time of the client computer clock received from the client computer;
   generating a computer identifier which incorporates the non-personal identification parameter related to the client computer and the delta of time parameter;
   comparing the computer identifier with another selected computer identifier;
   calculating a matching parameter based on said comparing, wherein said matching parameter is a raw number, score, or increment of measurement based on the difference between the computer identifiers;
   determining whether the matching parameter falls within a selected range; and based on the determination that the matching parameter falls within the selected range indicating, by some device or application, a positive match for linking one of the computer identifiers to one or more fraudulent transactions.

2. The method as recited in claim 1 further comprising the step of: obtaining additional identification parameters including personal identification information from the selected information.

3. The method as recited in claim 2, wherein the personal identification information includes consumer identification information.

4. The method as recited in claim 3, wherein the consumer identification information includes at least one of the following: consumer name, address, billing information, shipping information, telephone number and e-mail address.

5. The method as recited in claim 1, wherein the non-personal identification parameter is computer identification information.

6. The method as recited in claim 5, wherein the computer identification information includes an Internet parameter.

7. The method as recited in claim 6, wherein the Internet parameter is a CGI parameter.

8. The method as recited in claim 7, wherein the CGI parameter includes at least one of the following: IP address, and Browser ID.

9. The method as recited in claim 1 further comprising the step of:
capturing relevant time zone information in which the client computer is physically located from the selected information about the client computer.

10. The method as recited in claim 9, wherein the relevant time zone information is for one or more future dates indicating whether DST is observed in the relevant time zone.

11. A computer readable medium residing on a website server containing program instructions for identifying a client computer comprising:
computer code that provides a time capture script from the website server for execution by the client computer;
computer code that executes the time capture script to instruct a browser of the client computer to obtain from the client computer, at least one non-personal identification parameter;
computer code that captures from a clock of the client computer, the client computer time;
computer code that obtains from a clock of the website server, the server time;
computer code that calculates and stores, at the website server, a delta of time parameter based upon the difference between the server time and the client computer time received from the client computer;
computer code that generates a computer identifier which incorporates the delta of time parameter and the non-personal identification parameter;
computer code that compares the computer identifier with another selected computer identifier;
computer code that calculates a matching parameter based on said comparison, wherein said matching parameter is a raw number, score, or increment of measurement based on the difference between the computer identifiers;
computer code that determines whether the matching parameter falls within a selected range; and
computer code that indicates based on the determination that the matching parameter falls within the selected range, a positive match for linking one of the computer identifiers to one or more fraudulent transactions.

12. The method of claim 1, wherein correlating the client computer with potentially fraudulent transactions includes correlating the non-personal identification parameter with additional transaction related information based on the delta of time parameter.

13. The method of claim 1, further comprising differentiating the client computer from other computers based on the delta of time parameter.

14. The method of claim 1, wherein the delta of time parameter is stored in a time increment of seconds or greater.

* * * * *